(12) United States Patent
Ganti et al.

(10) Patent No.: US 8,560,628 B2
(45) Date of Patent: Oct. 15, 2013

(54) SUPPORTING AUTONOMOUS LIVE PARTITION MOBILITY DURING A CLUSTER SPLIT-BRAINED CONDITION

(75) Inventors: Veena Ganti, Austin, TX (US); James A. Pafumi, Leander, TX (US); Jacob Jason Rosales, Austin, TX (US); Morgan Jeffrey Rosas, Cedar Park, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 13/004,367

(22) Filed: Jan. 11, 2011

(65) Prior Publication Data
US 2012/0179771 A1 Jul. 12, 2012

(51) Int. Cl.
*G06F 15/167* (2006.01)
(52) U.S. Cl.
USPC ........... 709/213; 370/432; 370/249; 370/350; 709/238; 711/100; 711/130; 711/147
(58) Field of Classification Search
USPC .......................... 709/238; 370/432, 249, 350
See application file for complete search history.

(56) References Cited

U.S. PATENT DOCUMENTS

| | | | |
|---|---|---|---|
| 7,577,865 B2 | 8/2009 | Nguyen | |
| 7,631,066 B1 | 12/2009 | Schatz | |
| 7,992,048 B2 * | 8/2011 | Komatsu et al. | 714/43 |
| 2003/0187847 A1 * | 10/2003 | Lubbers et al. | 707/9 |
| 2004/0073831 A1 * | 4/2004 | Yanai et al. | 714/7 |
| 2004/0139124 A1 * | 7/2004 | Kawamura et al. | 707/202 |
| 2004/0205148 A1 | 10/2004 | Bae | |
| 2005/0120259 A1 * | 6/2005 | Aoki | 714/5 |
| 2006/0123024 A1 | 6/2006 | Sathyanarayan | |
| 2008/0189468 A1 | 8/2008 | Schmidt | |
| 2009/0125904 A1 | 5/2009 | Nelson | |
| 2009/0307460 A1 * | 12/2009 | Nevarez et al. | 711/203 |
| 2009/0313401 A1 * | 12/2009 | Mani et al. | 710/38 |

* cited by examiner

*Primary Examiner* — Andrew Lai
*Assistant Examiner* — Andrew C Lee
(74) *Attorney, Agent, or Firm* — Yudell Isidore Ng Russell PLLC

(57) ABSTRACT

A method, data processing system, and computer program product autonomously migrate clients serviced by a first VIOS to other VIOSes in the event of a VIOS cluster "split-brain" scenario generating a primary sub-cluster and a secondary sub-cluster, where the first VIOS is in the secondary sub-cluster. The VIOSes in the cluster continually exchange keep-alive information to provide each VIOS with an up-to-date status of other VIOSes within the cluster and to notify the VIOSes when one or more nodes loose connection to or are no longer communicating with other nodes within the cluster, as occurs with a cluster split-brain event/condition. When this event is detected, a first sub-cluster assumes a primary sub-cluster role and one or more clients served by one or more VIOSes within the secondary sub-cluster are autonomously migrated to other VIOSes in the primary sub-cluster, thus minimizing downtime for clients previously served by the unavailable/uncommunicative VIOSes.

20 Claims, 12 Drawing Sheets

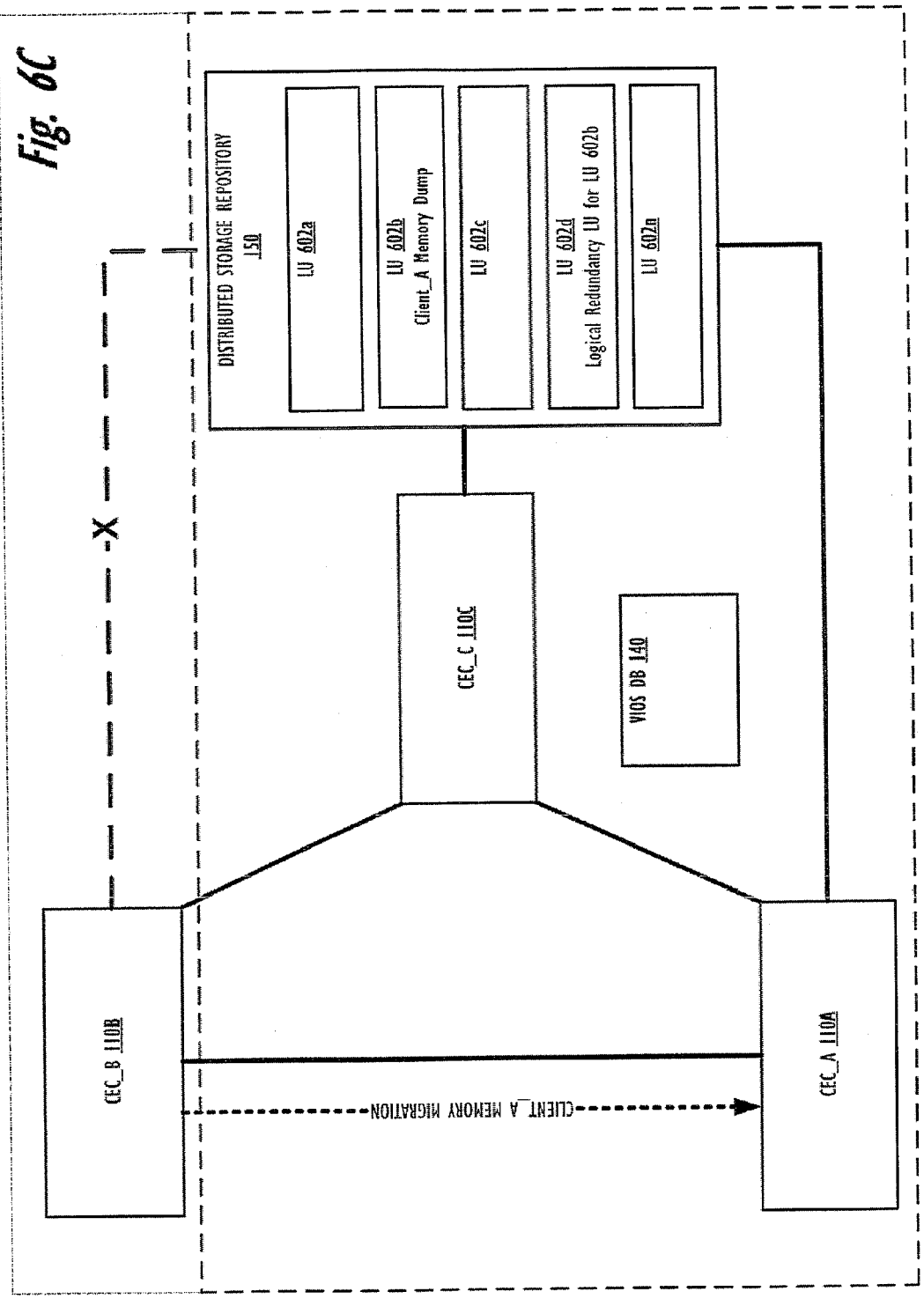

SUPPORTING AUTONOMOUS LIVE PARTITION MOBILITY DURING A CLUSTER SPLIT-BRAINED CONDITION

BACKGROUND

1. Technical Field

The present invention relates in general to distributed data processing systems and in particular to mechanisms for responding to a communication loss within a virtual input/output server (VIOS) cluster of the data processing system. Still more particularly, the present invention relates to an improved method and system for autonomously migrating a live partition to a new node of the VIOS cluster due to a communication loss within the VIOS cluster.

2. Description of the Related Art

Large scale, distributed data processing systems are known in the art. Today, storage virtualization and management is a separate entity than server virtualization and management. Different clients logical partitions (LPARs) associated with different servers access the same SAN storage. A client's LPARs on one server may not know if the SAN disk that it is trying to access is being used by some another client's LPAR belonging to some other server. This can cause data integrity issues and may potentially cause data corruption and client partition crashes.

Manually reinstalling and reconfiguring operating systems and applications at a secondary terminal is immensely time consuming and arduous task for a client (or a systems administrator) and also requires an amount of foresight that is not always possible (especially when terminals become unavailable due to hardware failure).

As cloud computing becomes more and more ubiquitous in the computer world, methods for providing enhanced functionality and greater up-time are required to continue to adequately serve commercial needs. Particularly for enterprise use, up-time is crucial. Therefore providing a client with access to their stored data with as close to 100% uptime is of the utmost importance.

SUMMARY

Disclosed are a method, system, and computer program products for utilizing Virtual Input/Output (I/O) Server (VIOS) communication services and Active Memory Sharing (AMS) to autonomously migrate clients serviced by a first VIOS to other VIOSes in the event of a VIOS cluster "split-brain" scenario. The VIOSes in the cluster continually exchange keep-alive information with other VIOSes within the cluster. The keep-alive information provides each VIOS with an up-to-date status of other VIOSes within the cluster and notifies the VIOSes when a node is no longer in the cluster or has otherwise become unavailable or uncommunicative. When this event is detected, one or more clients served by that VIOS can then be migrated to a second VIOS in the cluster, thus avoiding or minimizing any downtime for clients served by the unavailable/uncommunicative VIOS.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The described embodiments are to be read in conjunction with the accompanying drawings, wherein:

FIG. 6C is a block diagram illustrating a loss of connectivity scenario where a first CEC has lost access to a distributed storage repository, according to one embodiment;

DETAILED DESCRIPTION

Figure 1A:
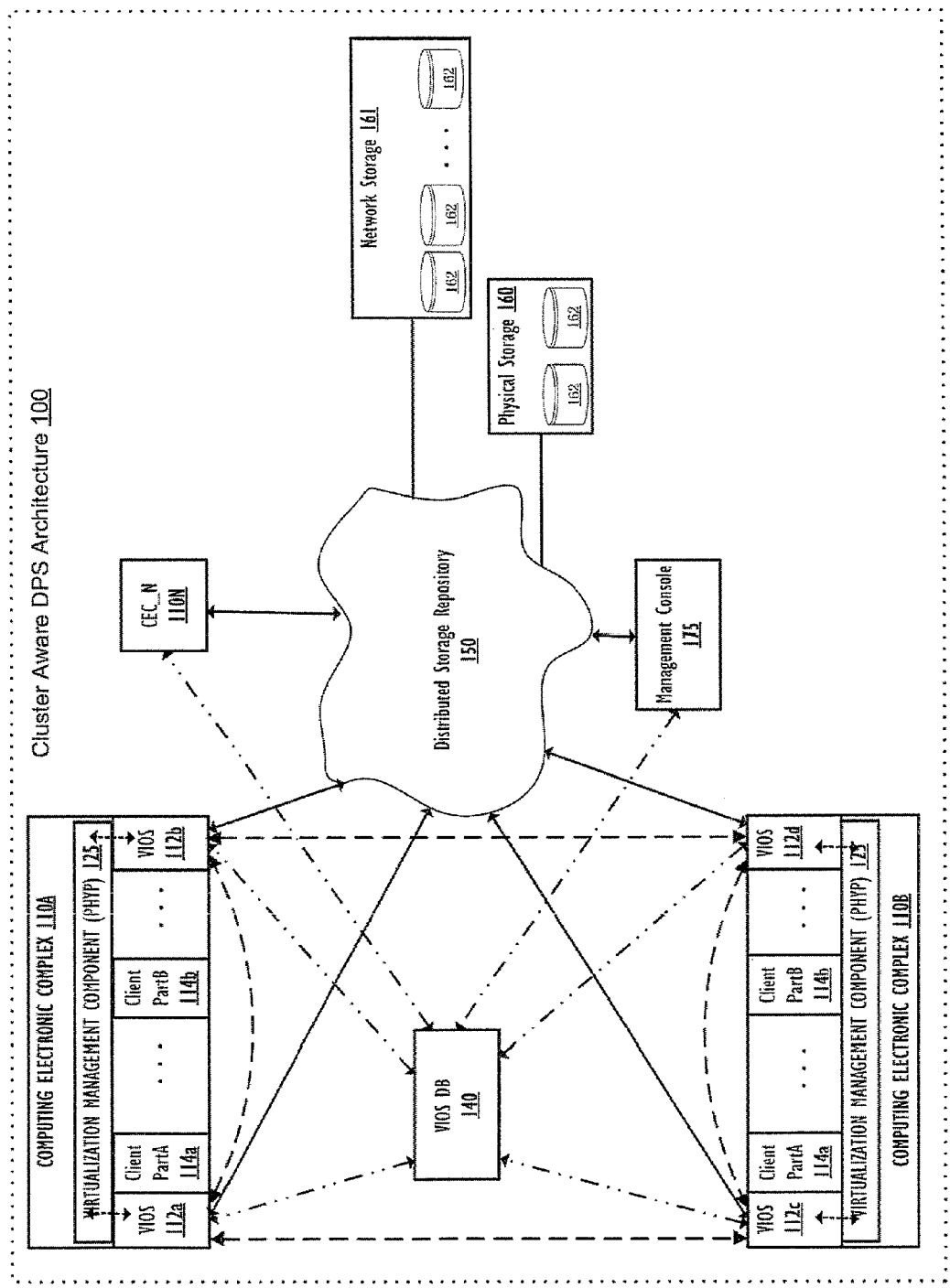
FIG. 1A illustrates a first view of a cluster (aware) data processing system within which various of the functional features of the described embodiments are implemented, according to one embodiment.

The illustrative embodiments provide a method, data processing system, and computer program product that utilizes Virtual Input/Output (I/O) Server (VIOS) communication services and Active Memory Sharing (AMS) to autonomously migrate clients serviced by a first VIOS to other VIOSes in the event of a VIOS cluster "split-brain" scenario. Responsive to the detection of a loss of connectivity at a first VIOS node of a plurality of VIOS nodes in the cluster a data assigned to a client is autonomously migrated to a second VIOS node and I/O operations and data are restored for the client by the second VIOS node. The method is performed within a clustered, data processing system (DPS) environment/architecture in which one or more cluster-aware VIOS enable efficient, secure access for a client LPAR to a single shared, network storage resource within the clustered DPS environment.

In one embodiment, a method, system, and computer program product autonomously migrate clients serviced by a first VIOS to other VIOSes in the event of a VIOS cluster "split-brain" scenario generating a primary sub-cluster and a secondary sub-cluster, where the first VIOS is in the secondary sub-cluster. The VIOSes in the cluster continually exchange keep-alive information with each other to provide each VIOS with an up-to-date status of other VIOSes within the cluster and to notify the VIOSes when one or more nodes loose connection to are no longer communicating with other nodes within the cluster, as occurs with a cluster split-brain condition. When this event is detected, a first sub-cluster assumes a primary sub-cluster role and one or more clients served by one or more VIOSes within the secondary sub-cluster can be autonomously migrated to other VIOSes in the primary sub-cluster, thus avoiding or minimizing any downtime for clients served by the unavailable/uncommunicative VIOSes.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the invention. The invention may thus be implemented with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the invention to embodiments in which different element, feature or concept names are utilized. Thus, each term utilized herein is to be given its broadest interpretation given the context in which that terms is utilized. For example, as utilized herein, the term cluster-aware refers to the operational state of each VIOS within the cluster where the VIOSes contain information about which other VIOSes are connected within the cluster, the configuration of the different CECs within the DPS supported by the cluster, information about which client LPARs are supported by each VIOS, and other state and operating information and data related to performing VIO operations using the physical I/O devices of the DPS and those of the distributed storage repository (storage repository). Cluster awareness is supported by both a shared, networked VIOS database and locally maintained copies of VIOS cluster data within each VIOS.

As further described below, implementation of the functional features of the invention is provided within processing devices/structures and involves use of a combination of hardware, firmware, as well as several software-level constructs (e.g., program code). The presented figures illustrate both hardware components and software components within example data processing architecture having a specific number of processing nodes (e.g., computing electronic complexes). The illustrative and described embodiments assume that the system architecture may be scaled to a much larger number of processing nodes.

In the following descriptions, headings or section labels are provided to separate functional descriptions of portions of the invention provided in specific sections. These headings are provided to enable better flow in the presentation of the illustrative embodiments, and are not meant to imply any limitation on the invention or with respect to any of the general functions described within a particular section. Material presented in any one section may be applicable to a next section and vice versa. The following sequence of headings and sub-headings are presented within the specification:

A. General Architecture
   B. Cluster-Aware VIOS
   C. Autonomous Propagation of Virtual IO to Second VIOS Due to Fabric Loss
   D. VIOS Cluster Mobility
   E. Active Memory Sharing for Live Partition Mobility
   F. Live Partition Mobility Due to Loss of Connectivity Conditions A. General Architecture With specific reference now to FIG. 1A, there is depicted a block diagram of an example cluster-aware (CA), distributed data processing system (DPS) architecture 100, within which the functional aspects of the described embodiments may advantageously be implemented. For simplicity, cluster-aware, distributed DPS architecture 100 shall be referred to herein simply as DPS 100. DPS 100 comprises a plurality of computing nodes, each referred to herein as a computing electronic complex (CEC), of which CECs 110A and 110B are illustrated. The number of CECs within DPS 100 may vary, ranging from a single CEC in a smaller system extending up to hundreds or thousands of CECs, in larger scaled systems. For simplicity, the embodiments shall be described from the perspective of a single CEC (CEC 110A) or two CECs (CECs 110A, 110B). Each CEC 110A-110B comprises at least one (and in most instances a plurality of) Virtual Input/Output Server 112 (also referred to herein as a VIO Server or VIOS), with functionality as described below. The actual number of VIOSes 112 within each CEC 110 of DPS 100 is a design feature and may vary. Also supported within each CEC 110A-110B are client logical partitions (interchangeably referred to as client LPARs or "clients"), of which a first two clients, clientA 114a and clientB 114b, are illustrated. As described below, with reference to FIG. 2, client LPARs 114 are logical partitions of a virtualized (or operating system partitioned) computing system. The actual number of clients within each CEC 110 may vary and could range from a single client to hundreds or thousands of clients, without limitation. For efficiency in presenting the inventive concepts herein, only two clients are presented within each CEC 110 of the various illustrative and described embodiments.

DPS 100 also comprises a distributed storage facility, accessible to each of the CECs 110 and the components within the CECs 110. Within the described embodiments, the distributed storage facility will be referred to as distributed storage repository 150, and the distributed storage repository 150 enables several of the client level functional features provided by the embodiments described herein. Distributed storage repository 150 provides a single view of storage that is utilized by each CEC 110 and for each client 114 of each CEC 110 within a cluster-aware, distributed system. Distributed storage repository 150 comprises local physical storage 160 and network storage 161, both of which comprise multiple physical storage units 162 (e.g., disks, solid state drives, etc.). The physical disks making up distributed storage repository 150 may be distributed across a storage network (e.g., a SAN). Additionally, distributed storage repository 150 provides a depository within which is stored and maintained the software utility, instruction code, OS images, client images, data (system, node, and client level), and/or other functional information utilized in maintaining the client-level, system management, and storage-level operations/features of DPS 100. In addition to distributed storage repository 150, DPS 100 also comprises a VIOS database (DB) 140, which may also be a distributed storage facility comprising physical disks across a storage network. VIOS DB (or DB) 140 is a repository that stores and provides access to various cluster configuration data and other functional components/modules and data structures that enable the various cluster-aware functionality described herein. In one embodiment, portions of distributed storage repository 150 may be allocated to provide storage pools for a cluster. Each VIOS 112 of the cluster maintains a local view of the DB 140 and updates the cluster level information/data/data structures within DB 140 as such information/data is created or updated.

Communication between each VIOS 112 of each CEC 110 as well as with the VIOSes of at least one other CEC 110 is generally supported via a plurality of inter-CEC interconnects, illustrated as bi-directional, dashed lines connecting pairs of VIOSes 112. The arrows indicated two way data exchange or communication between components. In addition to the inter-CEC interconnects, each VIOS 112 is also connected to distributed storage repository 150 via VIOS-to-Store or CEC-to-Store interconnects, which are also illustrated as full lined bi-directional arrows. Also, each VIOS 112 is connected to DB 140 via VIOS-to-DB interconnects, presented as dashed and dotted lines. With the exception of the inter-CEC connectors running from a first VIOS (e.g., VIOS 112a) of a first CEC to a second VIOS (e.g., VIOS 112b) on the same CEC, the various interconnects represent a network level connectivity between the VIOS nodes of the cluster and the DB 140 and the distributed storage repository 150. As utilized herein, references to one or more "nodes", are assumed to refer specifically to a VIOS within the cluster. DPS 100 also comprises a management console 175 on which a management tool (not shown) executes.

Figure 1B:
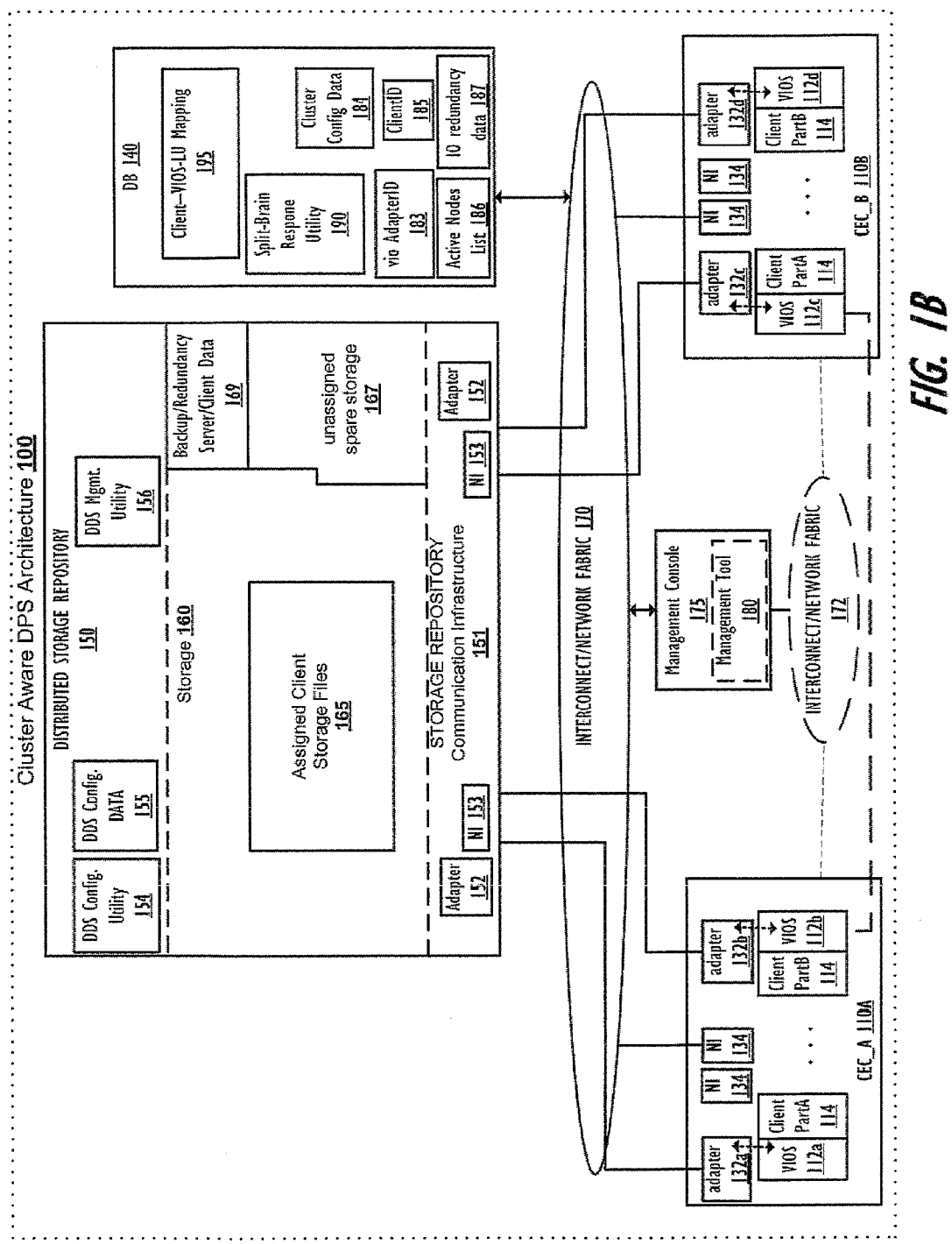
FIG. 1B illustrates a second view of the cluster data processing system (DPS) of FIG. 1A depicting additional functional components within the computing complexes and shared storage, according to one embodiment.

Turning now to FIG. 1B, there is illustrated another view of DPS 100 illustrating the network-based connection of the CECs 110 to the distributed storage repository 150 and DB 140. FIG. 1B illustrates in greater detail the network connectivity of VIOSes and CECs to each other and to Distributed storage repository 150. With this view, CEC_A 110A and CEC_B 110B comprise similar constructs as presented in FIG. 1A. Each CEC 110 within DPS 100 connects to distributed storage repository 150 via one or more networks and/or I/O interconnect/switch fabric (generally illustrated as interconnect/network fabric 170). The descriptions and illustrations assume that at least some of the CECs 110 of DPS 100 and distributed storage repository 150 are located remotely from each other, including being located in different countries, for example, such that no direct physical connectivity exists between the respective devices. For simplicity, the embodiments are described as having primary interconnect/network 170 comprising a private wide area network (WAN) or a public WAN (such as the Internet), although other network types (e.g., a local area network) are possible and supported.

As depicted, in one or more embodiments, each CEC 110 is also connected to one or more neighbor CECs 110, in order to provide efficient fail-over and/or mobility support and other functions, as described hereinafter. As utilized herein, the term neighbor refers to a connected second CEC with which a first CEC is able to communicate, and references to a neighbor CEC is not limited to a second CEC in geographic proximity to the first CEC. CEC_A 110A and CEC_B 110B are illustrated connected to each other via some connecting medium, which may include a different network (such as a local area network) 172 or some type of direct interconnect (e.g., a fiber channel connection) when physically close to each other. The connection between neighbor CECs 110A and 110B is illustrated as a direct line connection or a secondary network connection (172) between CECs 110A and 110B. However, it is appreciated that the connections are not necessarily direct, and may actually be routed through the same general interconnect/network 170 as with the other CEC connections to distributed storage repository 150. In one or more alternate embodiments, the connections between CECs may be via a different network (e.g., network 172, FIG. 1B), such as a local area network (LAN).

Also illustrated by FIG. 1B is an initial view of the component make-up of an example distributed storage repository 150 and an initial listing of some components of DB 140. As depicted, each CEC 110 comprises one or more network interfaces 134 and one or more I/O adapters 132 to enable the CEC 110 and thus the other components (i.e., client partitions) of the CEC 110 to engage in network level communication, as described below. Specifically, each VIOS 112 emulates virtual client I/O adapters to enable communication by the client LPARs 114 with distributed storage repository 150 and/or other clients, within the same CEC or on a different CEC. The VIOSes 112 emulate virtual I/O adapters and communicates with distributed storage repository 150 by connecting with corresponding virtual sever I/O adapters at distributed storage repository 150. The VIOSes 112 within each CEC 110 are thus able to support client level access to distributed storage 150 and enable the exchange of system level and client level information with distributed storage repository 150.

In addition, each VIOS 112 also comprises the functional components/modules and data to enable the VIOSes 112 within DPS 100 to be aware of the other VIOSes anywhere within the cluster (DPS 100). From this perspective, the VIOSes 112 are referred to herein as cluster-aware, and their interconnected structure within DPS 100 thus enables DPS 100 to also be interchangeably referred to as cluster-aware DPS 100. As a part of being cluster-aware, each VIOS 112 also connects to DB 140 via network 170 and communicates cluster-level data with DB 140 to support the cluster management functions described herein.

To support the virtual I/O operations with the VIOSes 112 and the associated virtual client I/O adapters, distributed storage repository 150 comprises communication infrastructure 151. Communication infrastructure 151 comprises network interface(s) 153 and a plurality of server I/O adapters 152 utilized for cluster-level communication and enabling access to data/code/software utility stored on distributed storage repository 150 to complete I/O operations thereto. Specifically, these server I/O adapters are also presented as virtual server I/O adapters, which are paired with virtual I/O adapters (132) that are assigned to clients 114 of CECs 110.

As shown with FIG. 1B, distributed storage repository (DSR) 150 also comprises a plurality of software, firmware and/or software utility components, including DSR configuration utility 154, DSR configuration data 155 (e.g., inodes for basic file system access, metadata, authentication and other processes), and DSR management utility 156.

To support the cluster awareness features of the DPS 100, and in accordance with the illustrative embodiment, distributed storage repository 150 also comprises VIOS database (DB) 140, in which is stored various data structures generated during set up and/or subsequent processing of the VIOS cluster-connected processing components (e.g., VIOSes and management tool). DB 140 comprises a plurality of software or firmware components and/or and data, data modules or data structures, several of which are presented in FIG. 1B, for illustration. Among these components are cluster management (CM) utility 182, VIO AdapterID data structure 183, cluster configuration data 184, Client identifying (ID) data 185, active nodes list 186, and I/O redundancy data 187, among others. These various components support the various clustering functionality and cluster-aware I/O operations of the one or more VIOSes 112, as described herein. Also illustrated within VIOS DB 140 are split-brain response utility 190 and VIOS-Client-LU mapping 195. VIOS-Client-LU mapping provides a single view of the allocation of clients to the various VIOSes and the logical units (LUs) of the storage pool of distributed storage repository that are assigned to each client. Split-brain response utility 190 executes within one or more VIOSes (such as a primary VIOS) to enable the cluster to respond to detection of a split-brain scenario/condition that can occur within the VIOS cluster by autonomously migrating clients from a non-communicative VIOS or set (sub-cluster) of VIOSes. Split-brain response utility 190 can be a component of CM utility 182, in one implementation. Additional features of DB 140 and distributed storage repository 150 as well as the specific components or sub-components that enable the various clustering functionality are presented within the description of the remaining figures and throughout the description of the various embodiments.

These various data structures are created, maintained and/or updated, and/or deleted by the various operations of one or more of the processing components. In one embodiment, the initial set up of the storage pools, VIOS DB 240 and corresponding data structures is activated by execution of a cluster aware operating system by management tool 180. Once the infrastructure has been established, however, maintenance of the infrastructure, including expanding the number of nodes, where required, is performed by the VIOSes in communication with DB 140 and the management tool 180.

Also associated with DPS 100 and communicatively coupled to distributed storage repository 150 and DB 140 and VIOSes 112 is management console 175, which may be utilized by an administrator of DPS 100 (or of distributed storage repository 150 or DB 140) to access DB 140 or distributed storage repository 150 and configure resources and functionality of DB 140 and of distributed storage repository 150 for access/usage by the VIOSes 112 and clients 114 of the connected CECs 110 within the cluster. As shown in FIG. 1B and described throughout the specification, management tool 180 is implemented within management console 175. However, it is appreciated that (resources of) any node within DPS 100 may be selected/elected to perform the functions of management tool 180, and the selected node would then perform one or more of the below described cluster creation and the other cluster monitoring and management functions, utilizing the availability of the resources provided by DB 140 and distributed storage repository 150.

In an alternate embodiment, management tool 180 is an executable module that is executed within a client partition at one of the CECs within DPS 100. In one embodiment, the management tool 180 controls the operations of the cluster and enables each node within the cluster to maintain current/updated information regarding the cluster, including providing notification of any changes made to one or more of the nodes within the cluster.

Figure 2:
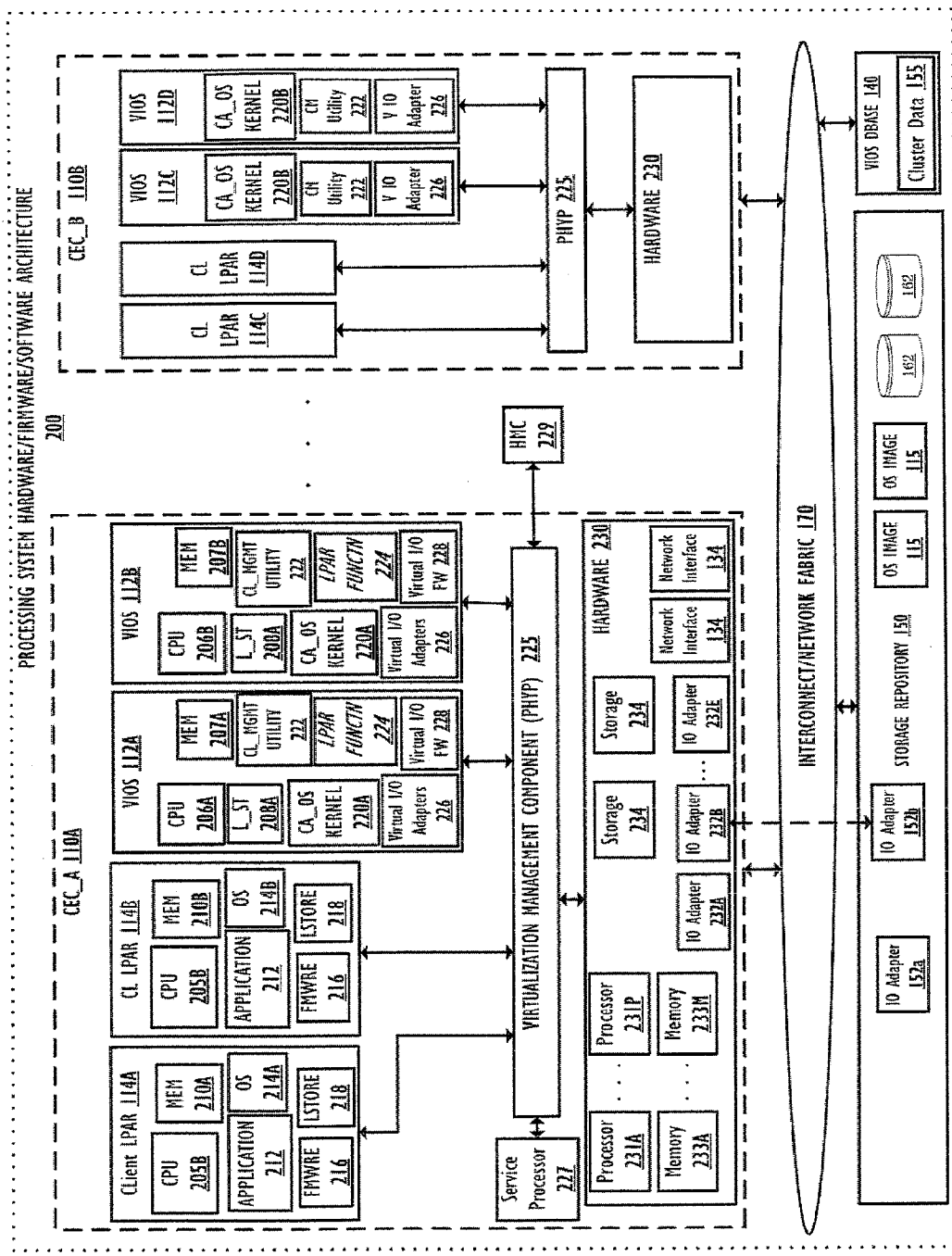
FIG. 2 illustrates an internal configuration of a computing electronic complex (CEC) within the cluster DPS having virtualized OS partitions, including virtual I/O server (VIOS) partitions, according to one embodiment.

With reference now to FIG. 2, there is presented a third view of an example DPS 100, emphasizing a processing system architecture 200 (i.e., architecture of the individual CECs, and specifically CEC_A 110A). CEC_A 110A (CEC 110A) serves as the example CEC that is described in greater detail in FIG. 2 and throughout the specification. CEC 110A is presented as a server that comprises hardware components and software/firmware/OS components that are logically partition to create a plurality of virtualized machine partitions, which are assigned as client logical partitions (LPARs) and virtual I/O servers (VIOSes). Hardware components 230 of example CEC 110A comprises one or more processors 231A-231P, one or more memories 233A-233M, and local storage 234. The processors 230A-230P are interconnected with one or a plurality of memories 233A-233M and with local storage 234 via a bus, interconnect/switch or an interconnect fabric (not specifically shown). The specific internal connectivity of components, which may be distributed across a large scale interconnect fabric, is not germane to the described embodiments, and no further detail is presented regarding the particular type of interconnectivity between the system hardware components.

Also included within hardware components 230 are one or more physical network interfaces 134 by which CEC_A 110A connects to an external network, such as network 170, among others. Additionally, hardware components 230 comprise a plurality of I/O adapters 232A-232E, which provides the I/O interface for CEC_A 110A. I/O adapters 232A-232E are physical adapters that enable CEC_A 110 to support I/O operations via an I/O interface with both locally connected and remotely (networked) connected I/O devices, including SF storage 150. Examples of I/O adapters include Peripheral Component Interface (PCI), PCI-X, or PCI Express Adapter, and Small Computer System Interconnect (SCSI) adapters, among others. CEC 110 is logically partitioned such that different I/O adapters 232 are virtualized and the virtual I/O adapters may then be uniquely assigned to different logical partitions.

Logically located above the hardware level (230) is a virtualization management component, provided as a Power Hypervisor (PHYP) 225 (trademark of IBM Corporation), as one embodiment. While illustrated and described throughout the various embodiments as PHYP 225, it is fully appreciated that other types of virtualization management components may be utilized and are equally applicable to the implementation of the various embodiments. PHYP 225 has an associated service processor 227 coupled thereto within CEC 110. Service processor 227 may be used to provide various services for one or more logical partitions. PHYP 225 is also coupled to hardware management controller (HMC) 229, which exists outside of the physical CEC 110. Operations of the different logical partitions may be controlled through HMC 229, which is a separate data processing system from which a system administrator may perform various functions, such as reallocation of resources to different logical partitions.

CEC_A 110A further comprises a plurality of user-level logical partitions (LPARs), of which a first two are shown, represented as individual client LPARs 114A-114B within CEC 110A. According to the various illustrative embodiments, CEC 110A supports multiple clients and other functional operating OS partitions that are "created" within a virtualized environment. Each LPAR, e.g., client LPAR 114A, receives an allocation of specific virtualized hardware and OS resources, including virtualized CPU 205A, Memory 210A, OS 214A, local firmware 216 and local storage (LStore) 218. Each client LPAR 114 includes a respective host operating system 214 that controls low-level access to hardware layer (230) of CEC 110A and/or to virtualized I/O functions and/or services provided through VIOSes 112. In one embodiment, the operating system(s) may be implemented using OS/400, which is designed to interface with a partition management firmware, such as PHYP 225, and is available from International Business Machines Corporation. It is appreciated that other types of operating systems (such as Advanced Interactive Executive (AIX) operating system, a trademark of IBM Corporation, Microsoft Windows®, a trademark of Microsoft Corp, or GNU®/Linux®, registered trademarks of the Free Software Foundation and The Linux Mark Institute) for example, may be utilized, depending on a particular implementation, and OS/400 is used only as an example.

Additionally, according to the illustrative embodiment, CEC 110A also comprises one or more VIOSes, of which two, VIOS 112A and 112B, are illustrated. In one embodiment, each VIOS 112 is configured within one of the memories 233A-233M and comprises virtualized versions of hardware components, including CPU 206, memory 207, local storage 208 and I/O adapters 226, among others. According to one embodiment, each VIOS 112 is implemented as a logical partition (LPAR) that owns specific network and disk (I/O) adapters. Each VIOS 112 also represents a single purpose, dedicated LPAR. The VIOS 112 facilitates the sharing of physical I/O resources between client logical partitions. Each VIOS 112 allows other OS LPARs (which may be referred to as VIO Clients, or as Clients 114) to utilize the physical resources of the VIOS 112 via a pair of virtual adapters. Thus, VIOS 112 provides virtual small computer system interface (SCSI) target and shared network adapter capability to client LPARs 114 within CEC 110. As provided herein, VIOS 112 supports Virtual real memory and Virtual shared storage functionality (with access to Distributed storage repository 150) as well as clustering functionality.

Within CEC 110A, VIOSes 112 and client LPARs 114 utilize an internal virtual network to communicate. This communication is implemented by API calls to the memory of the PHYP 225. The VIOS 112 then bridges the virtual network to the physical (I/O) adapter to allow the client LPARs 114 to communicate externally. The client LPARs 114 are thus able to be connected and inter-operate fully in a VLAN environment.

Those of ordinary skill in the art will appreciate that the hardware, firmware/software utility, and software components and basic configuration thereof depicted in FIGS. 1A, 1B and 2 may vary. The illustrative components of DPS 100 and specifically those within CEC 110A are not intended to be exhaustive, but rather are representative to highlight some of the components that are utilized to implement certain of the described embodiments. For example, different configurations of data processing systems/CECs devices may be provided, containing other devices/components, which may be used in addition to or in place of the hardware depicted, and may be differently configured. The depicted example is not meant to imply architectural or other limitations with respect to the presently described embodiments and/or the general invention. The CEC 110 depicted in the various figures may be, for example, an IBM eServer pSeries system, a product of International Business Machines Corporation in Armonk, N.Y., running the Advanced Interactive Executive (AIX) operating system or LINUX operating system.

B. Cluster-Aware VIOS

Certain of the features associated with the implementation of a cluster aware VIOS (e.g., VIOS 112 of FIGS. 1A, 1B and 2) are introduced above with reference to the description of the previous figures, and particularly FIG. 2. Descriptions of the specific functionality of the VIOS 112 will continue to be provided with reference to the illustrations of FIGS. 1A, 1B and 2. As presented by FIG. 2, each VIOS 112 is a virtual machine instance that emulates hardware in a virtualized environment. The VIOS 112 is tasked with emulating SCSI storage devices, and the VIOS 112 provides client LPARs 114 with access to distributed storage repository 150 in cooperation with the PHYP 225. Configuration of the VIOS 112 is performed through the hardware management tools of HMC 229. SCSI storage devices support a set of commands that allow SCSI initiators the ability to control access to storage (150). Database programs, for example, may manage access to distributed storage repository 150 through a set of SCSI commands commonly referred to as persistent reserve. Other types of reserves are also supported by VIOS 112, and the collective group of such commands is referred to herein as reserve commands.

As provided herein, each VIOS 112 allows sharing of physical I/O resources between client LPARs, including sharing of virtual Small Computer Systems Interface (SCSI) and virtual networking. These I/O resources may be presented as internal or external SCSI or SCSI with RAID adapters or via Fibre-Channel adapters to distributed storage repository 150. The client LPAR 114, however, uses the virtual SCSI device drivers. In one embodiment, the VIOS 112 also provides disk virtualization for the client LPAR by creating a corresponding file on distributed storage repository 150 for each virtual disk. The VIOS 112 allows more efficient utilization of physical resources through sharing between client LPARs, and supports a single machine (e.g., CEC 110) to run multiple operating system (OS) images concurrently and isolated from each other.

In one or more embodiments, the VIOS operating system(s) is an enhanced OS that includes cluster-aware functionality and is thus referred to as a cluster aware OS (CA_OS). One embodiment, for example, utilizes cluster aware AIX (CAA) as the operating system. According to one embodiment, cluster-awareness enables multiple independent physical systems to be operated and managed as a single system. As provided within VIOS 112 of CEC 110A, VIOS 112 comprises cluster aware (CA) OS kernel 220 (or simply CA_OS 220), as well as LPAR function code 224 for performing OS kernel related functions for the VIOS LPARs 114. When executed within two or more nodes of DPS, CA_OS 220 enables various clustering functions, such as forming a cluster, adding members to a cluster, and removing members from a cluster, as described in greater detail below. CA_OS 220 manages the VIOS LPARs 112 and enables the VIOSes within a cluster to be cluster aware. CA_OS 220 comprises several functional modules. In the described embodiments, CA_OS 220 comprises cluster management (CM) utility 222 which supports the configuration of the VIOS to enable cluster-awareness and cluster-level functionality, such as redundant virtual I/O. Each of these additional software components of CA_OS 220 may be a functional module within CM utility, in one embodiment, and each module is thus described as such throughout the remainder of this specification. In one embodiment, CM utility 222 may be a separate utility that is locally installed or downloaded (from DB 140, for example) as an enhancement to an existing OS within a CEC 110 or VIOS 112, when initially configured for operation within the VIOS cluster. CM utility 222 is then executed when configuring the individual VIOS to create or join a cluster and/or become a cluster-aware node within the VIOS cluster. With this implementation structure, CM utility 222 enables the OS to support the various cluster-awareness and other cluster-level features and functionality. In an alternate embodiment, CA_OS 220 includes all the clustering features and functionality and established the various features when the CEC 110/VIOS 112 joins the cluster and/or during configuration of VIOS 112 to become cluster-aware.

In one implementation, functional components of CM utility 222 are encoded on local device storage of a corresponding VIOS 112, such that the VIOS 112 becomes automatically configured as a part of the VIOS cluster when the VIOS 112 is initially activated. On initial set up of the VIOS, VIOS API, kernel extensions and virtual adapters are configured within VIOS to enable communication with the other VIOSes, the VIOS DB 140, and with the distributed storage repository 150. During this initial setup of the VIOS 112, the VIOS executes a registration module of CM utility 222 to register VIOS 112 with the cluster. The registration module enables VIOS 112 to retrieve/download or have forwarded from DB 140 (on successful registration with the cluster) any additional CM software components and/or cluster-level information and/or data required to establish full cluster awareness when the VIOS has completed installation and is activated within the CEC 110. Thus, in one embodiment, in addition to the locally stored CA_OS components and software modules of CM utility 222, other functional components of CM utility 222 may be downloaded from DB 140 when CEC is powered on or when one or more VIOSes 112 are enabled on CEC 110. Once the VIOS 112 has completed its setup, one or more client LPARs 114 that are activated within CEC 110 may be assigned to VIOS 112, and VIOS 112 subsequently performs the various I/O operations initiated by the client 114 (as initiator) or directed to the client 114 (as target). Updates to the local VIOS data may periodically be made as changes are made within the VIOS cluster and/or as one or more new client LPARs 114 are added to the CEC 110 requiring VIOS support. In one embodiment, CM utility 222 may also enable retrieval and presentation of a comprehensive view of the resources of the entire cluster.

It is appreciated that while various functional aspects of the clustering operations are described as separate components, modules, and/or utility and associated data constructs, the entire grouping of different components/utility/data may be provided by a single executable utility/application, such as CA_OS 220 or CM utility 222. Thus, in one embodiment, CA_OS 220 executes within VIOS 112 and generates a plurality of functional components within VIOS 112 and within DB 140. Several of these functional components are introduced within FIG. 1B and FIG. 2 and others are described throughout the various embodiments provided herein. For simplicity in the descriptions which follow, references to CM utility 222 and CA_OS 220 will be assumed to be referring to the same general component (i.e., CM utility 222 being a subcomponent of CA_OS 220), and the terms may be utilized interchangeably throughout the specification.

As further presented by the illustrative embodiments (e.g., FIG. 2A), VIOS 112 includes one or more additional functional modules/components, such as VIO adapter(s) (interface) 226, and virtual I/O drivers/utility 228, which provides I/O functionality to VIOS 112 and enables VIOS 112 to route data traffic to and from data structures and storage within distributed storage repository 150 and/or DB 140. Virtual I/O adapter(s) 226 and CM utility 222 also enable the VIOS 112 to provide each client LPAR 114 with access to the full range of storage accessible within distributed storage repository 150 and other cluster-supported functionalities, as described herein.

In the illustrative embodiment, each client LPAR 114 communicates with VIOS 112 via PHYP 225. VIOS 112 and client LPAR 114A-114B are logically coupled to PHYP 225, which enables/supports communication between both virtualized structures. Each component forwards information to PHYP 225, and PHYP 225 then routes data between the different components in physical memory (233A-233M). In one embodiment, a virtualized interface of I/O adapters is also linked to PHYP 225, such that I/O operations can be communicated between the different logical partitions and one or more local and/or remote I/O devices. As with local I/O routing, data traffic coming in and/or out of I/O adapter interface or network interface from a remote I/O device is passed to the specific VIOS 112 via PHYP 225.

With the above introduced system configuration of FIGS. 1A, 1B and 2A, a first VIOS 112a (through a communication channel established via PHYP 225), grants access to another VIOS 112b through one or more virtual adapters. VIOS 112 includes the functionality to query PHYP 225 for the identity of the Client LPAR 114 on the CEC 110 where the VIOS 112 is currently running With the cluster aware VIOS infrastructure, different VIOSes 112 associated with different CECs 110 access the distributed storage repository 150 and cluster-level information is shared/communicated across the VIOS cluster (via VIOS DB 140) while each client I/O process is being performed. In this manner the VIOS associated with a first client on a first CEC is aware of which SAN disk resources are being accessed by a second client on a second CEC (or on the same CEC). With this awareness factored into the I/O exchange with the distributed storage repository 150, the VIOS associated with the first client can avoid accessing the same storage resource that is concurrently being utilized by the second client, thus preventing data integrity issues, which could potentially cause data corruption and client partition crashes.

Figure 3:
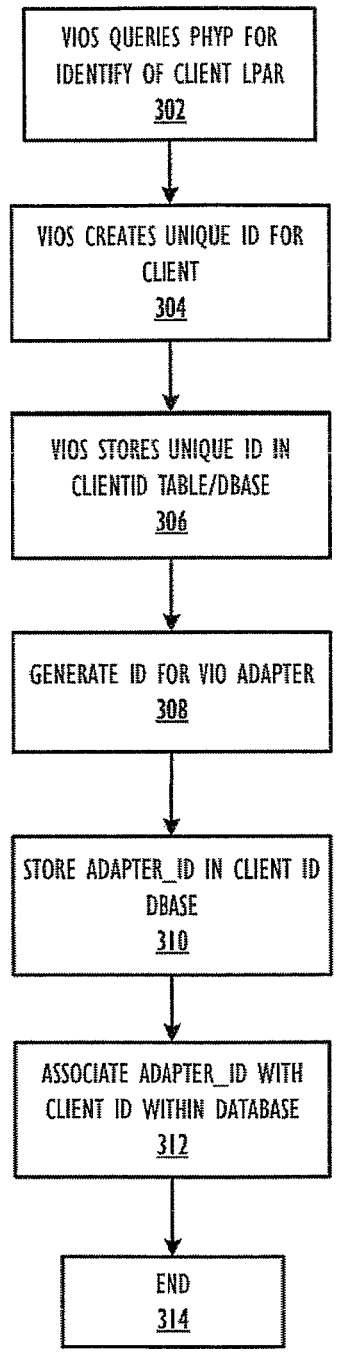
FIG. 3 is a flow chart of the method by which the process of client creation and registration is completed within a CA_DPS, according to one embodiment.

In one embodiment, VIOS functionality is enhanced to enable assigning of client identifiers (ID) and unique virtual I/O adapter IDs in a secure manner, while enabling storage pooling within virtual storage (within distributed storage repository 150). According to the described implementation, the different clientID-vioAdapterID pairings are unique throughout the cluster, so that no two clients throughout the entire cluster can share a same virtual adapter and no two vioAdapterIDs are the same within a single client. FIG. 3 is a flow chart illustrating the method by which a VIOS 112 on a CEC 110 with DPS 100 enables cluster level communication between a client LPAR 114 and distributed storage repository 150, according to one embodiment. The process begins at block 302 at which the VIOS 112 queries PHYP 225 for the identity of the client LPAR 114. At block 304, the VIOS 112 creates a unique identifier (ID) for the client (i.e., a ClientID). The VIOS 112 then stores the unique ClientID in ClientID data structure 159 (FIG. 1B) within DB 140 (block 306). The DB 140 and by extension the ClientID data structure 159 are accessible to each VIOS partition in the cooperating cluster (DPS 100). At block 308, the VIOS 112 also generates an identifier for each virtual IT nexus (virtual I/O AdapterID) that is utilized for each virtual adapter assigned to the client LPAR 114. In one embodiment, a client LPAR 114 can have multiple virtual adapters assigned thereto. These vio AdapterIDs are stored in the AdapterID data structure 158 (block 310) and are associated with their corresponding clientIDs (block 312). The method illustrated by FIG. 3 ends at termination block 314, with each clientID having been associated with the corresponding one or more vio AdapterIDs with DB 140.

As described herein, a cluster is a set of one or more networked VIOS partitions, where each VIOS within the cluster has access to a common set of physical volumes. The physical volume resides within the VIOS cluster and is utilized to provide block storage. Implementation of the cluster awareness with the VIOSes of the cluster enables the VIOSes to provide cluster storage services to virtual clients (client LPARs 114). The VIOS software stack provides the following advanced capabilities, among others: Storage Aggregation and Provisioning; Thin Provisioning; Virtual Client Cloning; Virtual Client Snapshot; Virtual Client Migration; Distributed Storage Repository; Virtual Client Mirroring; and Server Management Infrastructure integration. More generally, the VIOS protocol allows distributed storage to be viewed as centralized structured storage with a namespace, location transparency, serialization, and fine grain security. The VIOS protocol provides storage pooling, distributed storage, and consistent storage virtualization interfaces and capabilities across heterogeneous SAN and network accessible storage (NAS). In order to provide block storage services utilizing the distributed repository, each VIOS configures virtual devices to be exported to virtual clients. Once each virtual device is successfully configured and mapped to a virtual host (VHOST) adapter, the clients may begin utilizing the devices as needed. In one embodiment, the virtualization is performed utilizing POWER™ virtual machine (VM) virtualization technology, which allows the device configuration process to occur seamlessly because the physical block storage is always accessible from the OS partition.

C. Autonomous Propagation of Virtual IO from First to Second VIOS Due to Fabric Loss According to one embodiment, to take advantage of the clustered VIOS configuration whereby multiple VIOSes have access (or can gain access) to a shared block storage (such as the distributed storage repository 150), virtual clients (client LPARs 114) are configured with redundant access to multiple VIOSes. With this ability to provide client LPARs 114 with redundant access to multiple VIOSes, the described embodiments further enable a reduction in I/O errors that would otherwise be caused by a loss of connectivity to the network fabric by any one VIOS supporting I/O operations of a client LPAR 114. Thus, as described in greater detail below, a first VIOS partition that is currently servicing I/O requests from an initiator (client LPAR 114) can propagate I/O resources to other VIOSes within the VIOS cluster, such that a second VIOS can service the I/O request, where backup I/O servicing is needed.

As is described hereinafter, additional embodiments enable VIO operations to be autonomously propagated from a first VIOS to a second VIOS of the VIOS cluster following a fabric loss of the client-assigned (first) VIOS handling the VIO for the client LPAR. These embodiments are supported/provided by additional functionalities of (i.e., encoded within) the CA_OS 220 and/or specifically CM utility 222.

CM utility 222 is executed by virtual processing resources of VIOS 112 to provide a method for enabling the various I/O redundancy features and functionality described by the below presented embodiments. Among the method functions performed/provided by execution of the I/O redundancy module/code of the CM utility 222 are the following non-exclusive functions: (a) a first VIOS receiving an I/O request from the client LPAR; (b) detecting that a problem exists with a communication connection to the block storage; and (c) in response to detecting that the problem exists, autonomously propagating the I/O request to a second VIOS to which the first VIOS is connected within the VIOS cluster, wherein forwarding of the I/O request to the block storage is completed by the second VIOS.

Figure 4:
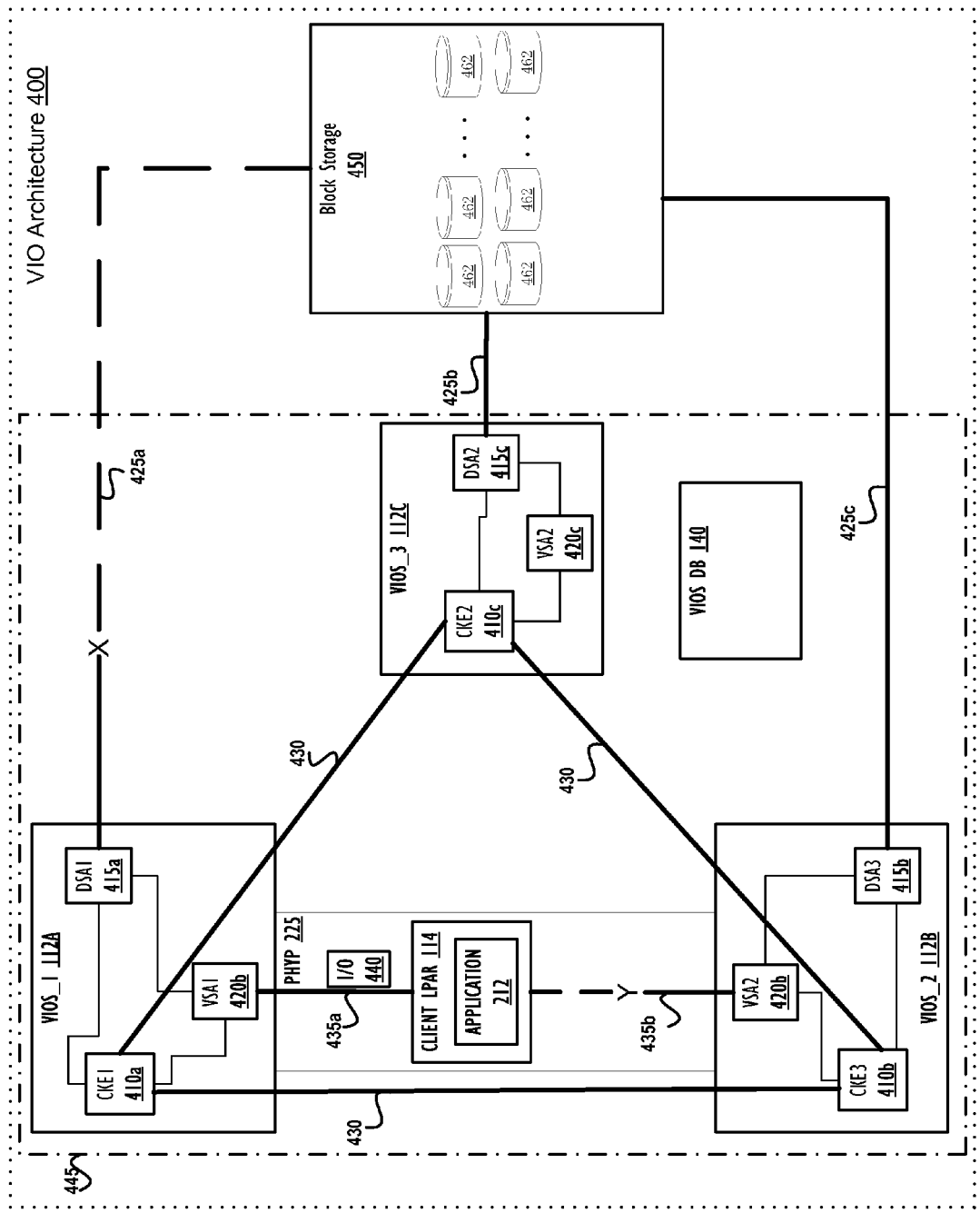
FIG. 4 is a block diagram representation of a cluster aware VIOS architecture that provides redundancy in VIO operations of a client logical partition (LPAR) due to a connectivity failure of a first VIOS assigned to the client LPAR, according to one embodiment.

Turning now to FIG. 4, there is illustrated a block diagram representation of the interconnectivity between VIOSes within an example VIOS cluster and between the VIOSes and shared block storage 450. Specifically, FIG. 4 provides a graphical representation of the method by which a first VIOS (112A) that is assigned to provide I/O operations for a client LPAR (114) responds to a loss of connectivity with the block storage facility 450, according to one embodiment. As utilized within the various embodiments, block storage 450 (or block storage facility) represents any type of storage that is generally accessible from any one of multiple VIOSes within a VIOS cluster. This, block storage 450 may be the distributed storage repository 150, other network accessible storage, or local storage (e.g., storage 234 of FIG. 2). When block storage 450 is distributed storage repository 150, block storage may be a SAN or NAS, in one embodiment.

As illustrated by FIG. 4, virtual I/O (VIO) architecture 400 comprises three interconnected VIOSes, VIOS1 112A, VIOS2 112B and VIOS3 112C. Each VIOS 112 connects to block storage 450 via respective system-level storage interconnect fabric 425a, 425b, and 425c. While illustrated as a single interconnect, the connection between the VIOSes and block storage 450 is generally referred to herein as a storage interconnect fabric 425 since the actual connection may be a complex switch or network of wires. It is further appreciated that one or more communication hops within storage interconnect fabric 425 can be a wireless connection. The term fabric loss thus refers to any type of degradation or stoppage in the ability of a VIOS 112 to transmit (or receive) data over any portion of storage interconnect fabric 425 to/from block storage 450. The actual type of fabric loss (at the storage level) does not directly affect the redundancy methodology being described herein.

Each of VIOS1 112A (first VIOS), VIOS2 112B (second VIOS) and VIOS3 112C (third VIOS) is interconnected via intra-cluster interconnect fabric 630, which connects each VIOS (e.g, VIOS_A 112A) with one or more other VIOSes (e.g., VIOS 112B and 112C) within to create the VIOS cluster 445. VIOS Cluster 445 also comprises VIOS DB 140 to which each VIOS 112 within the cluster is connected (via respective cluster-level interconnect fabric, which are not specifically shown). Notably, within the described embodiments, the second and/or third VIOSes (112b/112c) can exist on the same CEC or a different CEC within the cluster from the first VIOS 112a. To provide an illustration of the different treatment of VIOSes when on the same CEC or on a different CEC, VIOS2 112B is presented as on the same CEC, while VIOS2 112B is presented as existing on a different CEC, with the illustrations of FIGS. 6B and 6C.

Each VIOS 112A, 112B, 112C includes internal software structures within respective software stacks by which the VIOSes 112A, 112B, 112C are able to communicate with each other as well as with VIOS DB 140 and distributed storage repository 150. For example, illustrated within first VIOS 112A are the following software structures, without limitation: (1) cluster kernel extension (CKE) 610a, which is a kernel extension that allows the each VIOS (e.g., first VIOS 112A) to communicate with other VIOS nodes (e.g., second VIOS 112B) within the VIOS cluster 445; (2) distributed storage access (DSA) 615a, which is also a virtual interface that monitors the connectivity of a storage fabric from the VIOS; and (3) virtual server adapter (VSA) 620a, which is the virtualized I/O adapter that the VIOS assigns to a specific client to communicate I/O requests between the client LPAR 114 and the assigned VIOS(es). During I/O redundancy operation, VSA 420 handles the communication of the I/O request from the client and the communication of I/O response to the client. DSA 415 checks the connection status of the storage interconnect 425 of the VIOS and signals CKE when a fabric loss condition is detected on the interconnect 425. CKE 410 handles the propagation of the I/O request to another VIOS when a fabric loss condition is detected by DSA and is communicated by DSA 415 to CKE 410. The additional functionality associated with and/or manner of usage of the above set of software structures are presented in detail below.

In the illustrative example, the I/O requests 440 sent from client LPAR 114 to VIOS1 112A is forwarded to CKE1 610a from VSAT 420a, and CKE1 610a forwards the I/O request 440 to CKE2 610b of the second VIOS 112B. CKE2 610b in turn sends the I/O request onward to the block storage 450. The described embodiments thus provide a cluster level of redundancy, which supports increased system availability and reliability within the clustered system when unforeseen hardware/software issues arise.

As further illustrated by FIG. 4, when a fabric loss condition occurs that results in a loss of communication between the first VIOS 112A that is assigned to provide I/O service to the client LPAR 114, the first VIOS 112A detects the loss of (or significant degradation in) connectivity at/on the storage interconnect fabric 435a between the first VIOS 112A and distributed storage repository 150. For illustrative purposes, a loss of VIOS connectivity (or access) to the distributed storage repository 150 is described as loss of physical connection (or connectivity) to the distributed storage repository 150, and is illustrated with an "X" marking a premature termination of the specific interconnect (425a). This fabric loss of connectivity is further illustrated and indicated by the presence of dashed lines. Thus, in contrast, the presence of solid connecting lines indicates the existence of a good connection between connected devices, as with second storage interconnect fabric 425b and third storage interconnect fabric 425c.

The presently described embodiments focus primarily on a communication loss that is a physical fabric loss (X). However, alternate embodiments contemplate situations in which the first VIOS 112A itself fails or has an internal error condition that prevents the first VIOS 112A from being able to provide/fulfill the I/O operations to/of the client LPAR 114. In this scenario, the loss may be software related, and one such loss is illustrated within FIG. 6 with a "Y" marking an inability to communicate I/O operations from/to the client LPAR 114. In another embodiment, a third type of fabric loss, which is a loss of VIOS fabric connection to/with VIOS DB 140 may also be addressed by providing VIOS enabled backup redundancy.

The selection of the particular second VIOS may be based on selecting a "closest" VIOS as the second VIOS. In this implementation, the closest VIOS can be one or more of: a VIOS which takes a least amount of propagation time for transfer of the I/O request from the first VIOS; a VIOS which takes a least amount of propagation time for completing an I/O request at the distributed shared repository; and a VIOS among the VIOS cluster that is physically located on a same CEC as the first VIOS.

D. VIOS Cluster Mobility

According to one or more embodiments, the algorithms/functional software modules provided by CM utility 222 also account for the VIOS moving from a first CEC, referred to herein as the source CEC, to a second CEC, referred to herein as the destination CEC. One of the roles played by the VIOS in enable performance of a mobility operation within the cluster aware DPS 100 is to describe the storage that is in use on the source CEC to the VIOS on the destination CEC. The description provided by the first VIOS 112a includes a key into the adapter table 425 for the source adapter. The key is utilized to find the client (114) and unique AdapterID information, based on the database relationship (e.g., the association of data structures (e.g., tables) within the database). The unique AdapterID is passed to the kernel extension, which verifies storage access. The PHYP signals the termination of the mobility operation, and as part of that completion, the row within the VIOS table is updated with the new CEC relative identifier. Thus, while the move of the particular LPAR is completed, the unique AdapterID assigned to that OS partition is not changed within the database (distributed storage repository). The CEC relative identifier allows the VIOS to be discovered, while the unique AdapterID allows secure implementation of storage pool access rights. This scheme allows flexibility in the management tools implementation for pool security allowing for convenience of use by the system administrator.

As introduced above, with advanced VIOS implementation, a distributed storage configuration across clustered VIOS partitions is supported by distributed storage repository 150. In other words, distributed storage repository 150 is treated as a one big storage pool, with chunks of physical storage (logical units or LUs) allocated to each client LPAR. In one or more embodiments, each VIOS within the cluster (DPS 100) can be considered a node in the cluster. Each VIOS is able to communicate with other VIOSes utilizing an established communication protocol. If two or more client LPARs belonging to different CECs share storage on the SAN (distributed storage repository 150), implementation of the VIOS communication protocol makes it possible to query each VIOS about the current usage of the shared storage device and disseminate this information to other VIOSes within the cluster. This shared communication enables each VIOS to know whether or not the SAN storage device (distributed storage repository 150) that the VIOS is trying to access is currently being used by some other LPAR, and thus prevent data corruption and possible VIOS and/or client crashes.

E. Active Memory Sharing for Live Partition Mobility

With the above described configurations of a DPS 100 configured with distributed storage repository 150, DB 140, and CECs 110 having VIOSes that are clustered and/or cluster aware through use of DB 140, additional embodiments are provided to enable efficient storage virtualization and management utilizing the VIOSes 112 described above. Implementation of these additional embodiments may involve additional functional components (utilities) of the CA_OS 220 and/or specifically CM utility 222. According to one or more embodiments, the CM utility 222 also enables active memory sharing of a same storage device within the distributed storage repository by one or more VIOSes 112.

Within the distributed storage repository, all the storage devices are virtualized into a large storage pool where chunks of storage units (logical units (LUs)) can be carved out and assigned as paging devices for each client. Each client is able to utilize an assigned logical unit (LU) as a paging file thereby facilitating sharing of the storage device and reduce wastage. PHYP 225 provides an interface between a client LPAR and a VIOS and performs various storage I/O operations such as moving or pulling data for one or more VIOSes 112 accessing the LUs. A same logical unit (LU) may be used/accessed by one or more client LPARs 114 owned by the same client via one or more VIOSes 112 of one or more CECs 110. For security purposes, however, a client is unable to access a LU belonging to another client, and a single LU is not shared between different clients.

CM utility 222 provides code/program instructions that are executed on one or more virtual processor resources of one or more VIOSes 112 within CEC 110 to provide specific functions. Among the functionality provided by CM utility when executed and which are described in greater details herein are the following non-exclusive list: (1) a plurality of VIOSes exchanging keep-alive information with each other; (2) autonomously monitoring the keep alive information exchanged between the plurality of VIOSes; (3) detecting from the keep alive information that a first VIOS from the plurality of VIOSes is no longer available, wherein the first VIOS serves one or more clients of the data processing system on a first computing electronic complex (CEC); (4) in response to detecting that the first VIOS is no longer available: determining a first client having an assigned first client LPAR of one or more clients that is serviced by the first VIOS; assigning a second VIOS to service the client in place of the first VIOS; and determining a storage device within a distributed data storage that is allocated to the first client; (5) assigning the storage device to the second VIOS; and (6) migrating a plurality of I/O data and operations of the client to the second VIOS.

Figure 5:
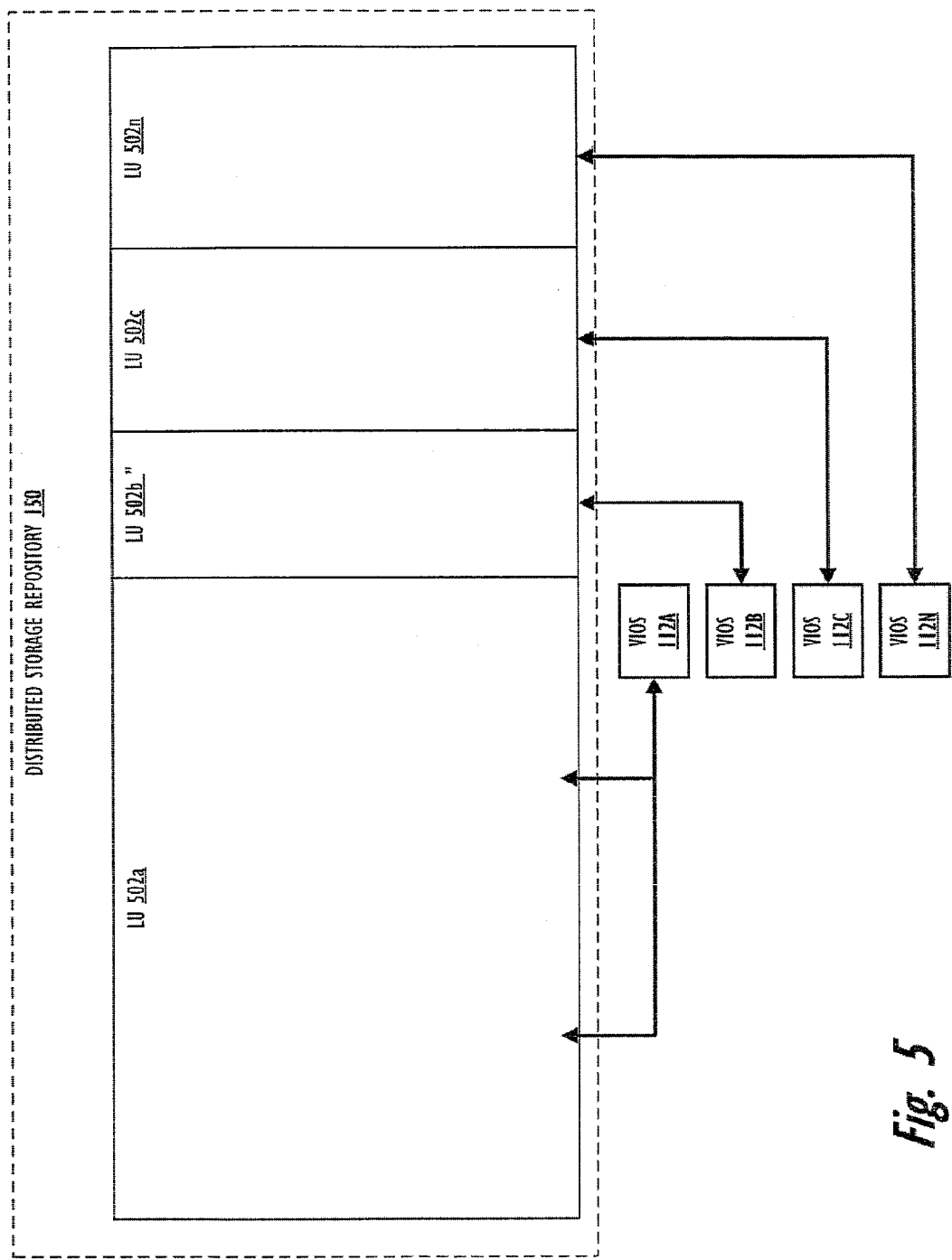
FIG. 5 is a block diagram illustrating the usage of VIOS Logical Units (LUs) as paging devices for enabling active memory sharing (AMS) for applications of a client LPAR, according to one embodiment.

FIG. 5 is a block diagram illustrating the usage of VIOS Logical Units (LUs) as paging devices for enabling active memory sharing (AMS) for applications of a client LPAR. The CA VIOS protocol builds on existing virtual SCSI (VSCSI) technology to provide distributed storage across clustered VIOS partitions. Active memory sharing (AMS) allows treating all storage on the server system as one big "virtual" storage pool with chunks of storage (partitions) LUs 502a-n allocated to client LPARs (e.g., LPARs 114-a-n) depending on the LPARs specific entitlement (or requirement).

The AMS functionality described herein overcommits memory at the LPAR level. Each client LPAR is allocated a Logical Unit (LU) of a determined size. The size of the allocated LU may be less than the amount that is actually available to the client and is based on the memory required by software (e.g., Applications, Operating Systems) of the client LPAR.

Since a single disk can be divided into small chunks (LUs) of a smaller size (e.g, a 20 GB disk divided into smaller 2-4 GB LUs), when a client is offline the available memory previously allocated to that client that is not in use can be given by the PHYP to clients that are online, thus reducing page-in and page-outs for the online client. If a client is allowed up to 4 GB but only requires 2 GB at a specific time, the PHYP may only provide a 2 GB LU to the client. The LUs also allow thin provisioning which further reduces wasted storage. The thin provisioning feature allows for efficient use of storage by only allocating physical storage for the logical unit when the actual storage is needed. Additionally, the PHYP may dynamically increase or decrease the size of a LU as needed by a client. Since all LPARs 114a-n share storage from the same pool, the distributed storage repository is much more efficiently utilized as clients are only provided with the amount of storage they require at a given time, not what is assigned or paid for (i.e. memory storage is not "over-committed"), while still providing each requesting application/OS with persistent paging storage.

Once the paging file request is received, the VIOS automatically partitions a new LU 502 from the distributed storage repository 150 and assigns the new LU 502 to the requesting application/OS of the client LPAR. Once allocated, a logical unit (LU) 502 functions as a normal paging file for input/output data for use by the requesting application/OS via VIOS 112. VIOS 112 may then autonomously direct all subsequent paging file I/O data of the requesting application/OS to the new LU 502. In one embodiment, each LU 502a-n may be subdivided into sub partitions.

In another embodiment, a logical redundancy partition of a LU may also be created for a first LU 502. The logical redundancy partition is a second LU that is a dynamic copy of a first LU. For both AMS and hibernation applications, and also for Remote Access Service (RAS) applications, a redundant configuration allows a first LU to be accessible from one or more paging VIOSes. Each change in a first LU is autonomously/dynamically echoed in real-time to a logical redundancy LU (redundant LU). If a portion of data in a first LU is locked by a first VIOS, a second VIOS may instead redirect a read request to the logical redundancy LU (since the second LU is a dynamic, up-to-date copy of the first LU and therefore contains the same data). In this embodiment, a second VIOS can simultaneously access the same data being utilized by the first VIOS without having to wait for the first VIOS to "unlock" the first logical unit. In one or more embodiments, the logical redundancy LU may be restricted to read-only access (with the exception of the periodic synchronization/redundancy operations), in order to prevent changes to the redundant LU (redundant copy of data being overwritten) unless/until those changes occur in the primary (first) LU. In one or more embodiments, access to the first LU and the second LU may be controlled within the VIOS cluster by each VIOS tracking the lock status of a LU that the VIOS is attempting to access before proceeding with such access. Thus, for example, a first VIOS that has a client request directed at the first LU assigned to that client checks with a "LU status table" within distributed storage repository 150 or, in an alternate embodiment, within VIOS DB 140 or some other shared storage. The first VIOS locks the LU when the LU is not currently locked. When a second VIOS has an I/O request that targets the same first LU, the second VIOS checks the LU status table and receives notification that the first LU is currently locked. However, if the request is a read request, the VIOS may retrieve the location of the second redundant LU, complete a security verification process (e.g., to ensure the I/O adapter information matches the original I/O adapter information), and once verification is confirmed, the second VIOS can then access the redundant LU and read the data from the redundant LU. This embodiment can be enabled when the LU is a shared LU that contains data for a plurality of different clients.

Additionally, this functionality may be extended to enable seamless migration of a client LPAR to another CEC. A VIOS may receive a request to migrate a first client LPAR having an allocated LU and a logical redundancy LU that is an exact copy of the allocated LU (including the I/O adapters and other settings (except the write-to access setting), in one embodiment) of a first CEC to a second CEC that is different from the first CEC. Responsive to receiving the migration request, the logical redundancy LU is allocated as a primary LU to a second VIOS within the second CEC. The second VIOS may then start/restart a second client LPAR for the client within the second CEC. I/O data and operations of the second client LPAR are then performed/managed by the second VIOS at the new primary LU of the second VIOS (the former logical redundancy LU of the first allocated LU).

F. Live Partition Mobility Due to Loss of Connectivity Conditions

Figure 6A:
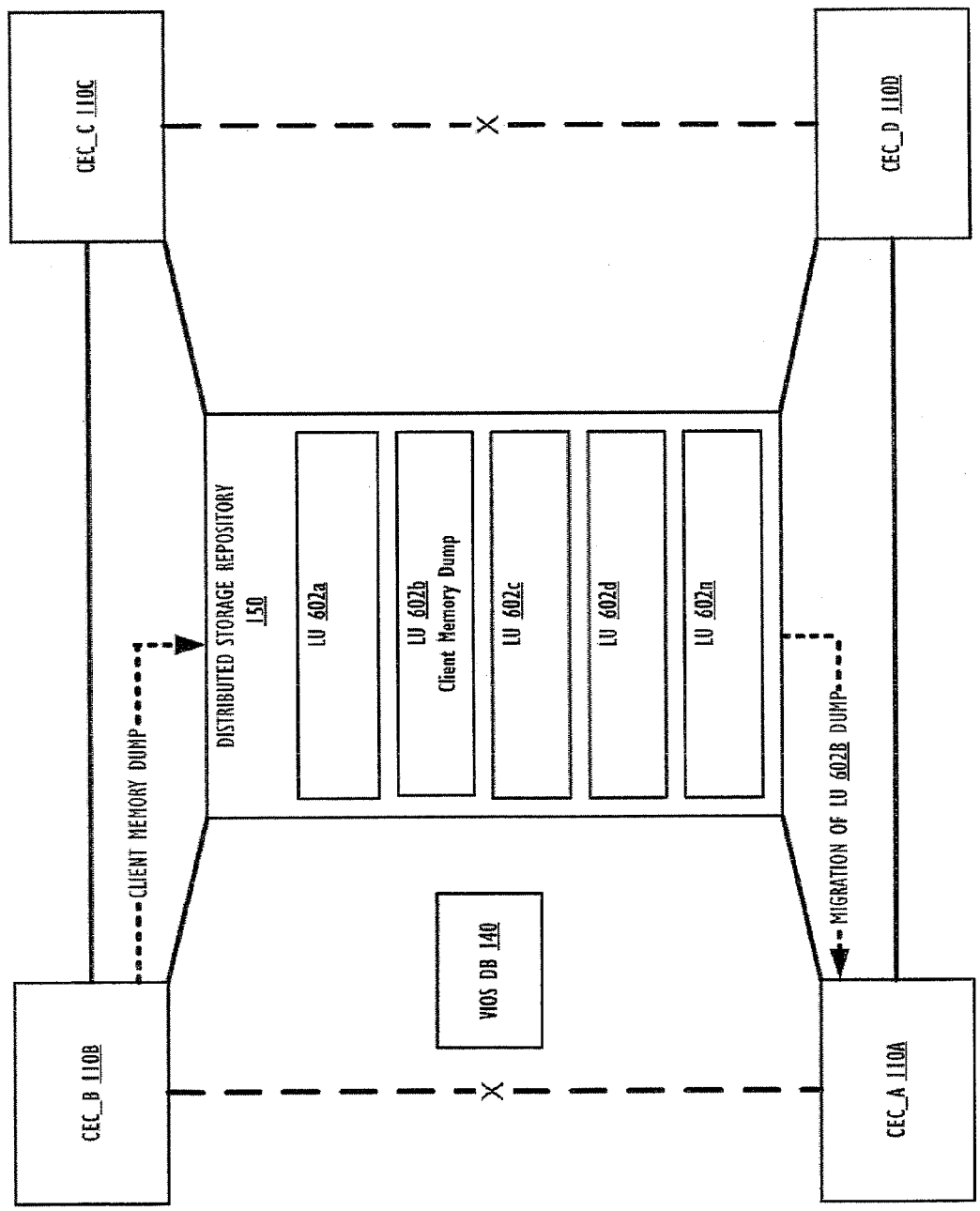
FIG. 6A is a block diagram illustrating, from a CEC-level perspective, a "split-brained" scenario in a cluster-aware VIOS environment wherein two sub-clusters have formed, according to one embodiment.

FIG. 6A is a block diagram illustrating, from a CEC-level perspective, a "split-brained" scenario in a cluster-aware VIOS environment wherein two sub-clusters have formed. A VIOS cluster may become "split-brained" (i.e. gets divided into two sub-clusters) due to loss of network connectivity with another sub-cluster, for example. The sub-cluster may be a single VIOS, or any number of VIOSes within a CEC, up to and including an entire CEC, or VIOSes on a plurality of CECs. However, for illustrative purposes, as shown in FIG. 6A, the VIOS cluster is divided into a first sub-cluster comprising two CECs, CEC 110A and CEC 110D and a second sub-cluster comprising CEC 110B and CEC 110C. As illustrated, the affected sub-cluster(s) still have connectivity to the distributed storage repository. Loss of connectivity of nodes in a first sub-cluster with nodes in a second sub-cluster can cause the VIOSes in both sub-clusters to believe that the nodes in the other sub-cluster are unavailable. In addition, this may cause one or more nodes to believe they control a critical resource (such as distributed storage repository 150) exclusively which can lead to corruption. To avoid this situation, cluster communication services are invoked between VIOSes to detect loss of connectivity scenarios between VIOSes and autonomously/automatically dump client data for affected VIOSes to the distributed data storage for migration to another, unaffected, VIOS (in the same CEC or a different CEC). This eliminates or minimizes any downtime for clients served and/or serviced by an unavailable VIOS.

In the split-brain scenario depicted in FIG. 6A, VIOSes on CEC_B 110b and CEC_C 110c have lost communication (loss of keep-alive information) with CEC_A 110a and CEC_D 110d. This "split-brained" scenario is detected by one or more VIOSes still in the cluster and/or the primary node or management tool (e.g. Management Tool 180) within the cluster. As soon as detection of the "split-brain" condition due to loss of the keep alive information between nodes has occurred, one of the sub-clusters assumes the role of the continuing cluster (i.e., the sub-cluster that will remain operational and take over the role of the former (larger) VIOS cluster), with the other sub-cluster determined to be a non-continuing sub-cluster (i.e., the VIOSes will migrate their clients to the continuing sub-cluster along with relevant I/O assignments/data and then stop operating as a VIOS cluster). The primary node or management tool determines one or more clients previously serviced by the VIOSes on CECs 110 in the non-continuing sub-cluster. By reading a list of clients (stored within the VIOS DB 140), the primary node or management tool may then trigger one or more VIOSes on a first CEC 110 in a first (non-continuing) sub-cluster (CEC_A 110a or CEC_D 110d) to autonomously migrate client related data (configuration data, image files, LUs, etc) to another VIOS in a second (continuing) sub-cluster using distributed storage repository 150 as temporary storage for storing dumped data for one or more clients affected by the loss of connectivity.

In one embodiment, a VIOS 112 that is losing connection or being kicked out from the cluster can preemptively detect the pending loss of connectivity to the other VIOSes and begin migration of the clients assigned to that VIOS by initiating the dumping of data belonging to one or more clients served by that VIOS 112 to storage devices within distributed storage repository 150. For example, a first VIOS 112 (or a management tool) within CEC_B 110b detects that connections to CEC_A 110a and CEC_D 110d are being lost/severed. In response, the first VIOS 112 on CEC_B 110b begins dumping data (including data from one or more of: volatile memory, non-volatile memory, and data stored in a client LPAR) for clients served by the first VIOS on CEC_B 110Bb to storage devices within distributed data storage 150. A second VIOS on CEC_A 110a can then perform an autonomous migration of the dumped data from a storage device assigned to the client within distributed storage repository 150 to CEC_A 110a responsive to detecting loss of connectivity to the first VIOS or being notified of the loss of connectivity of the first VIOS.

Selecting which sub-cluster continues operation as the continuing sub-cluster can be decided via any number of different ways. Of the numerous possible ways, a few are presented herein, and it is understood that other methodologies can be utilized in other embodiments. In one embodiment, a first methodology involves preventing a non-continuing sub clusters from gaining access to shared physical resources. In one implementation, when a cluster split brain is identified, each sub cluster can utilize hardware fencing to fence off the other sub cluster nodes from accessing the shared physical devices. In this case, the continuing sub-cluster would fence off the VIOS DB and the distributed repository disks visible to each node. One embodiment allows a first sub-cluster that raises the fence on the shared resources to become the primary cluster. Once the fence, has been raised, the primary node can query the VIOS DB to retrieve a list of clients that where utilizing storage provisioned from nodes in the secondary (fenced off and thus non-continuing) cluster. Once this information is obtained, migration commands can be sent to the management machines of the non-continuing/secondary cluster to initiate the migration from the secondary cluster to the primary cluster.

In another implementation, a kill switch is provided that has a similar effect as the fencing process. In this scenario, the kill switch would be executed from the primary clusters and would incapacitate a secondary cluster by either kicking the nodes in this secondary cluster out of the cluster, revoking device leases, or even forcing the nodes to shutdown.

In another embodiment, the primary node of the original cluster (which remains functional within one of the sub-clusters) may autonomously determine which of the sub-clusters should be made to migrate its client level (I/O) data to in order to prevent both sub-clusters from dumping data to distributed storage repository 150. The primary node can perform an election based on which sub-cluster has the largest number of nodes, such that a lesser burden is provided for migrating data across sub-clusters by selected the largest sub-cluster as the continuing sub-cluster.

Figure 6B:
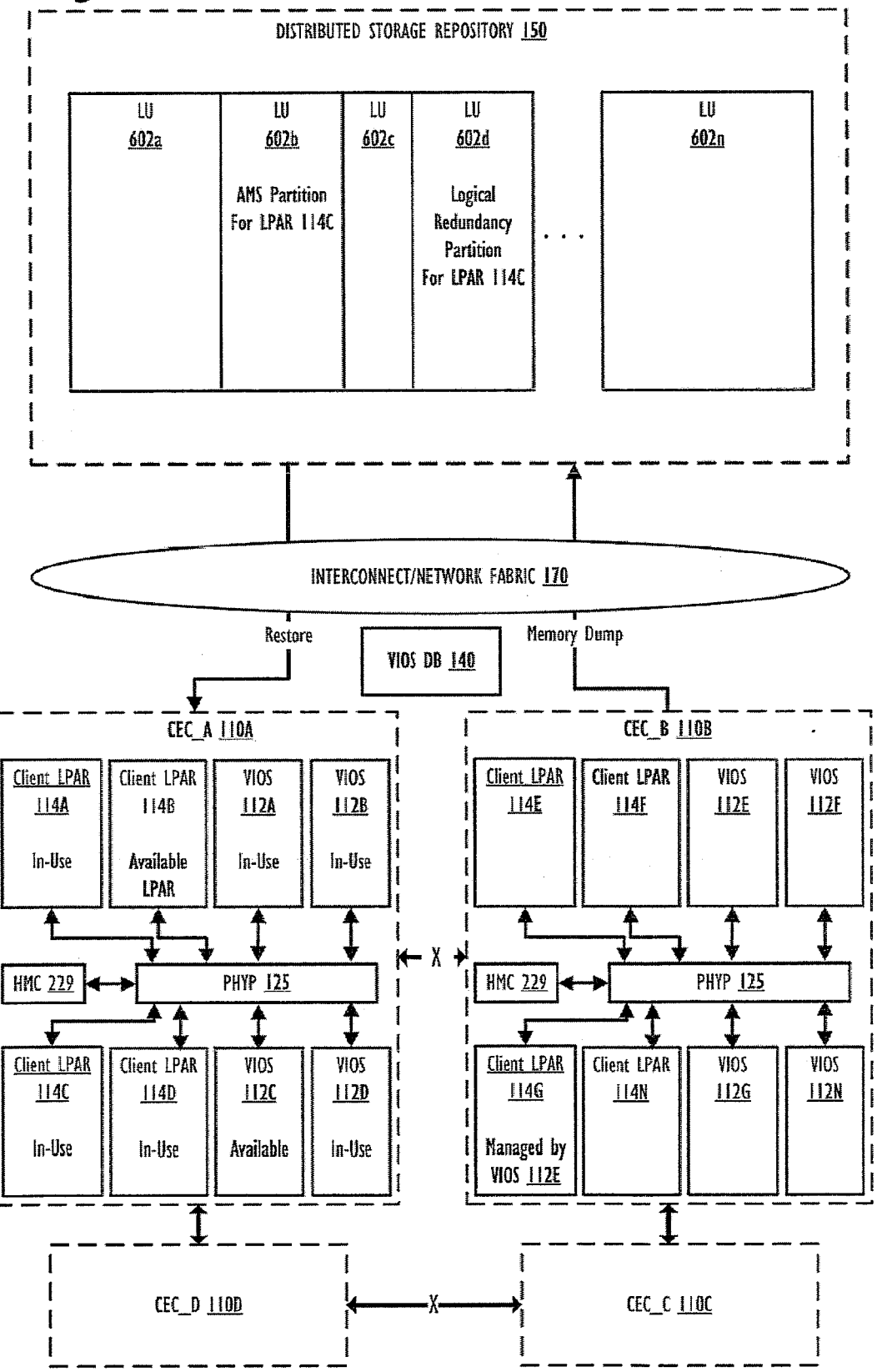
FIG. 6B is a block diagram illustrating the "split-brained" scenario of FIG. 6A from a VIOS-level perspective, according to one embodiment.

FIG. 6B is a block diagram illustrating the "split-brained" scenario of FIG. 6A from a VIOS-level perspective. All VIOS partitions in the VIOS cluster have access to the same distributed storage repository and shared VIOS DB 140. The cluster communication/notification infrastructure enables VIOSes 112a-n to continually exchange keep-alive information with other VIOSes 112a-n within the cluster. The keep-alive information is autonomously exchanged between VIOSes 112a-n and provides each VIOS 112a-n with up-to-date statuses of other VIOSes 112a-n within the cluster. This communication infrastructure provides notification to the VIOS partitions when a node is no longer in the cluster, and enables a second VIOS 112c to determine and/or receive information regarding data and resources consumed by a first VIOS 112e when the first VIOS 112c has otherwise become unavailable.

An unavailable VIOS 112 is a VIOS that is no longer directly accessible to other nodes within the cluster. Some potential (but not all-inclusive) explanations for a VIOS becoming unavailable may be due to a hardware and/or software failure within the CEC 110 on which the VIOS resides, or because the VIOS itself has failed, been compromised, or otherwise disconnected from the cluster. Additionally, a VIOS 112 may be determined to be unavailable when the VIOS 112 has become non-responsive or when the VIOS 112 has not communicated or responded to the cluster within a specified and/or predetermined amount of time. Since VIOSes 112a-n are cluster-aware and continually exchange keep-alive information between each other, any VIOSes 112a-n that are still connected to the cluster are made aware (notified) when a first VIOS 112 (e.g., VIOS 112e) has become unavailable (following a time period without receiving an "alive" signal from the particular VIOS). The VIOSes 112a-n and/or PHYP 125 may autonomously monitor the keep-alive information for communication anomalies by VIOSes 112a-n. An unavailable VIOS 112 can be detected by any detecting party. A detecting party can be any VIOS 112a-n, or another entity such as PHYP 125, a primary node, or a management tool (e.g. Management Tool 180). Responsive to a detection of an unavailable VIOS (e.g., VIOS 112E) an arbitrator autonomously alerts the other VIOSes 112a-n and/or HMC 229 or any combination therein of the loss of the first VIOS 112e. The primary node is a designated VIOS within the cluster-aware VIOS that can detect or respond to communication anomalies by VIOSes 112a-n, and the primary VIOS functions as a lead VIOS of the VIOSes in the cluster. The arbitrator is a primary node or any arbitration mechanism (such as Management Tool 180 or CM Utility 222) that, responsive to detection of communication anomalies by VIOSes 112a-n, assigns a second VIOS from the one or more available VIOSes as a target for a migration of a client. The arbitrator may also change a status of a first VIOS 112 within VIOS DB 140 responsive to a VIOS 112 becoming unavailable.

Responsive to determining/detecting the "split-brained" scenario within the cluster, the arbitrator can then assign a second VIOS 112c to serve/service each of the one or more clients previously served by a first VIOS 112e. The second VIOS 112c is not necessarily a new VIOS 112, but instead is any VIOS 112 that has access to the storage device(s) (LU 602) assigned to the client within data storage repository 150 and is still part of the cluster after the detection of the anomaly. The second VIOS 112c can then determine, for each newly assigned client (that was previously served by the first VIOS 112e), if a client has an allocated storage device (e.g., LU 602b) within distributed data storage repository 150. In one embodiment, the storage device can be an AMS storage device. Responsive to determining that a client has an AMS storage device that is allocated to the client LPAR 114, volatile and non-volatile memory utilized by the first client (e.g., contents of random access memory (RAM), cache memory, hard disk memory, and data stored within a client LPAR previously assigned to the first client) may be dumped (copied) to the allocated AMS storage device. When an allocated AMS storage device within the distributed data storage 150 cannot be determined for a client that is/was managed by the now-unavailable VIOS 112e, a new AMS storage device can be autonomously created and allocated to the client LPAR 114 as an allocated AMS storage device before the memory contents can be copied (dumped) to the allocated AMS storage device. A second client LPAR 114b can also be assigned and/or created, for the client on a next CEC, for example, by the second VIOS.

After the second VIOS 112c has been assigned to the client, the allocated storage device may be autonomously restarted, migrated, and/or restored on the second VIOS 112c for the client. I/O data (e.g., adapter IDs and assignments, et al.) and I/O operations for the client are then migrated to the second VIOS 112c and access is provided to any assigned client LPARs and/or storage devices, depending on a previous level of access assigned to a client. The level of access provided by the second VIOS 112c following the migration can be identical to the level of access that was previously provided to the client on the first VIOS 112e, in one embodiment. Thus any interruption of services to the client has been substantially minimized or eliminated since nothing appears to have changed from the client's point of view. All I/O data and operations between the client and the first (previously managing) VIOS (first VIOS 112e) has been wholly migrated, restarted and/or restored to second VIOS 112c. Thus, responsive to the loss of first VIOS 112e, a client previously serviced by the first VIOS 112e is now serviced by the second VIOS 112c, which may or may not be on a same or a different CEC 110 from the first VIOS. Any client LPARs 114 assigned to the first VIOS 112e may therefore also be migrated and/or restored to a different CEC.

FIG. 6C is a block diagram illustrating a different communication loss scenario where a first CEC has lost access/connectivity to a distributed storage repository. As illustrated, the affected sub-cluster(s) can still have connectivity to other sub-clusters. Loss of connectivity to the distributed storage repository could cause the client LPARs served by the VIOSes in that sub-cluster to crash and/or prevent the client LPARs from booting up unless corrective actions are taken. In this communication loss scenario, keep-alive information is still exchanged between nodes so that affected clients can be autonomously/automatically migrated to another sub-cluster that has connectivity to the distributed data storage. The migration process can actually begin preemptive to the "communication loss" scenario and/or responsive to storage access issues by assigning a logical redundancy LU to a second VIOS on the sub-cluster that will still have connectivity to the distributed data storage. The logical redundancy LU provides a dynamic copy of another storage device (LU). The affected clients are thus migrated using an active migration. This eliminates or minimizes any downtime for clients served and/or serviced by an unavailable VIOS. The sub-cluster may be a single VIOS, or any portion of VIOSes within a CEC, up to and including an entire CEC.

In another embodiment, a single LU (whether a normal LU or a logical redundancy LU) may be mapped to more than one VIOS in order to prevent further duplication of data. Thus either first LU 602b or logical redundancy LU 602d may be mapped to a first VIOS and a second VIOS. The second VIOS may normally be inactive until a loss of the first VIOS is detected at which point the second VIOS becomes active and provides seamless I/O service to either first LU 602b or logical redundancy LU 602d for a client.

In one embodiment, responsive to determining/detecting a communication loss scenario, a logical redundancy partition may instead be immediately restored, migrated and/or restarted to a second VIOS 112c. Since logical redundancy LU 602d provides a dynamic copy of a plurality of data already stored within a first LU 602b, the second VIOS 112c may immediately employ this up-to-date logical redundancy LU 602d to provide a client with seamless or near-seamless access to the clients' stored data. This is advantageous since a first VIOS 112e may have crashed and in the process inadvertently "locked" other VIOSes 112 from accessing and/or writing to the first LU 602b of the client. Since a client's data may be partly or completely stored on a LU 602 (and thus is also identically stored on the logical redundancy LU), any interruption of service to a client would be minimized or eliminated. The interruption of service, if any, would be limited by a response time between determining/detecting the loss of a first VIOS and the activation of the second VIOS for the client. Thus, depending on the response time, an interruption of service can be imperceptible to a client. For example, responsive to detecting the loss of VIOS 112e that was utilizing storage within LU 602b, second VIOS 112c may be immediately assigned to the client (by the arbitrator) and second VIOS 112c migrates and/or restarts I/O data and operations for a client to either LU 602b or logical redundancy LU 602d for a second LPAR 114b assigned to the client. The second VIOS may or may not be located on a different CEC from the first VIOS.

Since first VIOS 112e does not have connectivity to distributed storage repository 150, second VIOS 112c may request, transfer, or receive volatile and non-volatile memory utilized by the first VIOS 112e (e.g., contents of random access memory (RAM), cache memory, hard disk memory, data stored within a client LPAR assigned to the first client) directly from the first VIOS 112e via the connectivity between CEC_A 110A and CEC_B 110B. The volatile and non-volatile memory may also include an active memory state. Thus, any combination of data in use at CEC_B 110B by a first VIOS 112e can be efficiently migrated to VIOS 112e. Even though a client is now being served by a different VIOS (VIOS 112c) on a different CEC and/or is accessing a different storage device (e.g., Logical Redundancy LU 602d instead of LU 602b), the client operations and accesses remain the same from the perspective of the client.

Figure 7A:
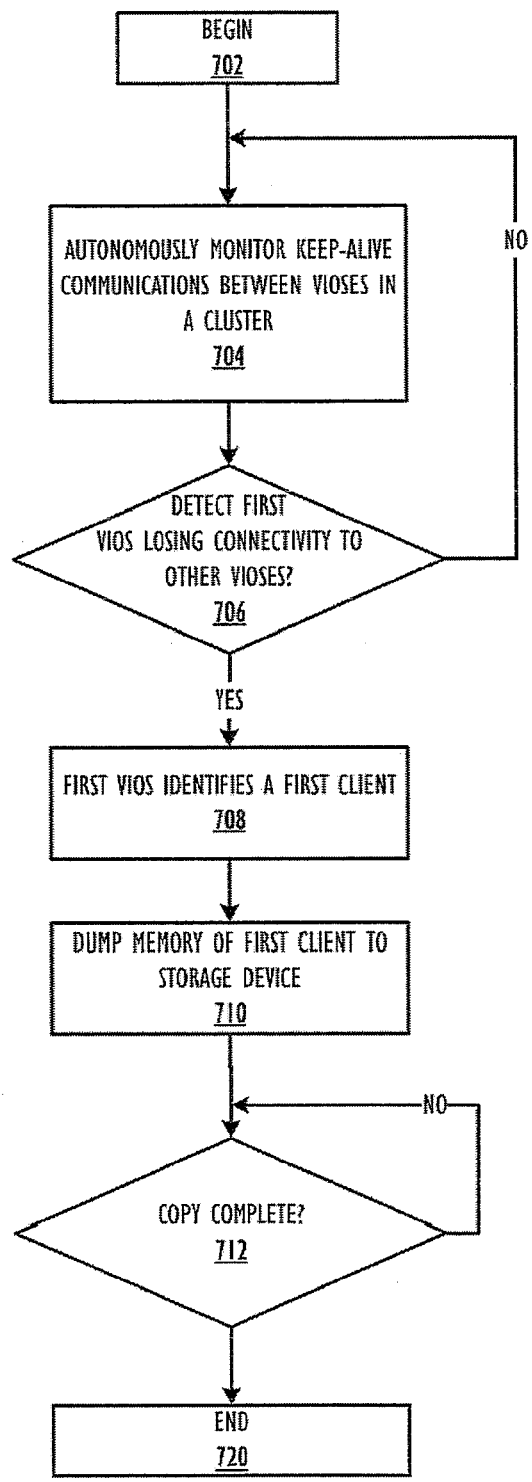
FIG. 7A is a high-level logical flowchart of an exemplary method of a first VIOS dumping memory contents of a client to distributed data storage responsive to detection of a "split-brained" scenario, according to one embodiment.
Figure 7B:
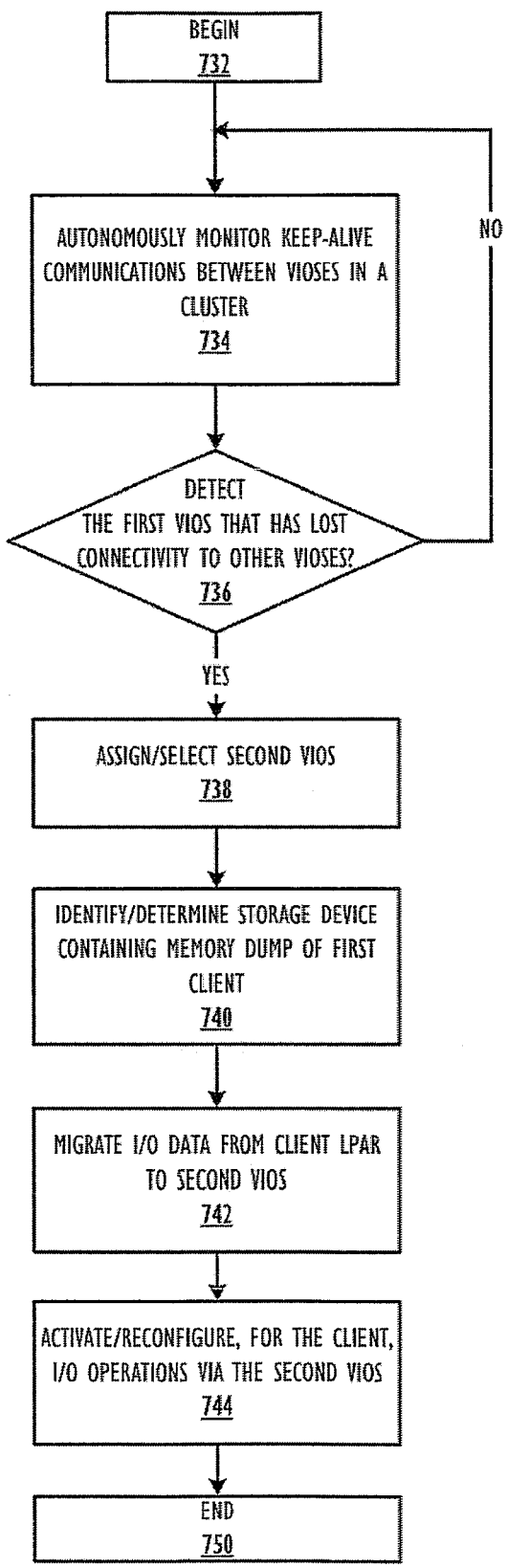
FIG. 7B is a high-level logical flowchart of an exemplary method for a second VIOS migrating memory contents of a client from distributed data storage, according to one embodiment.
Figure 8:
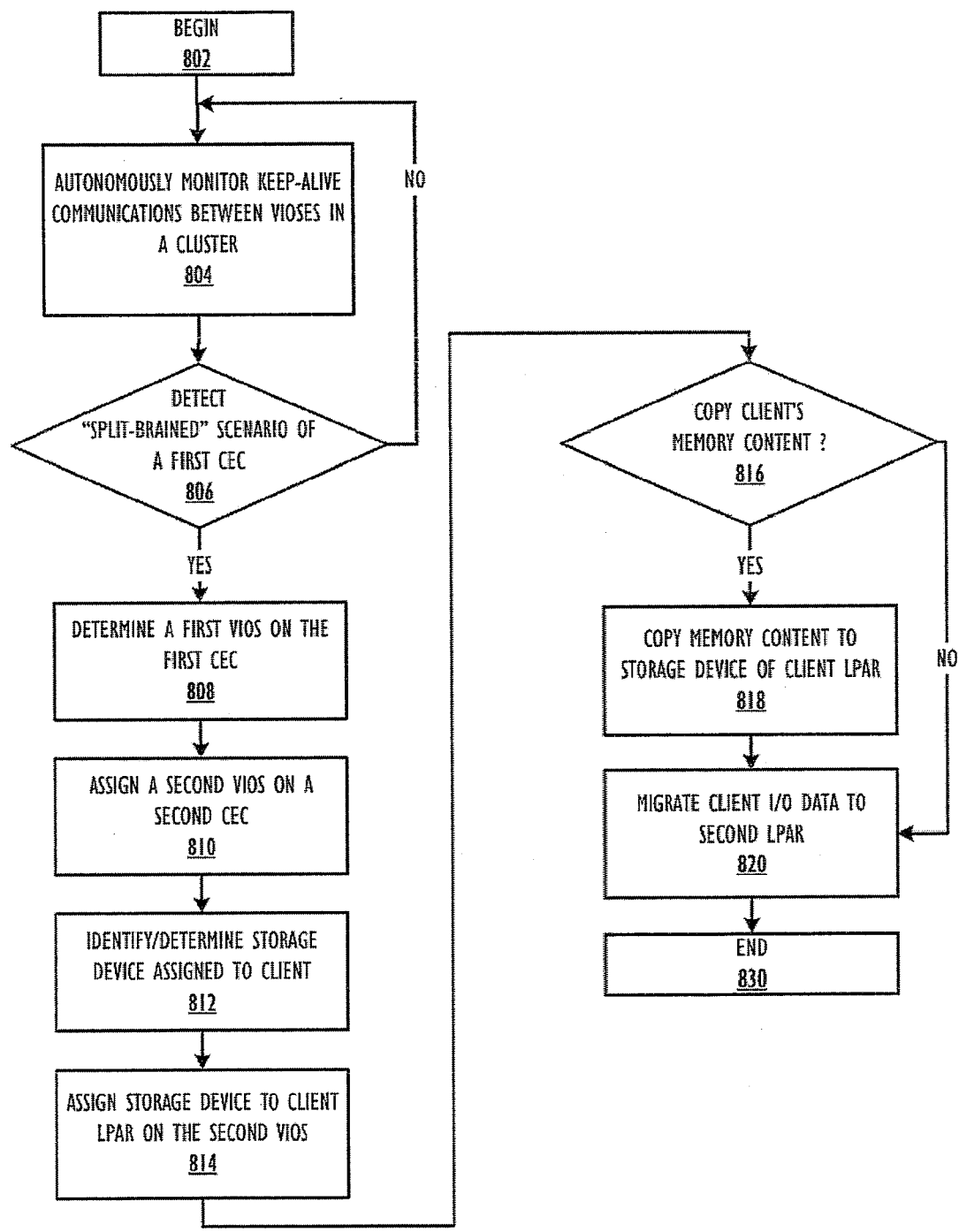
FIG. 8 is a high-level logical flowchart of an exemplary method for restarting memory contents of a logical redundancy unit to a second VIOS in a different CEC than a first VIOS responsive to detection of a loss of connectivity scenario where a first CEC has lost access to a distributed storage repository, according to one embodiment.

FIGS. 7A, 7B, and 8 are flow charts illustrating various methods by which the above processes of the illustrative embodiments are completed. Although the methods illustrated in FIGS. 7-8 may be described with reference to components and functionality illustrated by and described in reference to FIGS. 1-6 it should be understood that this is merely for convenience and alternative components and/or configurations thereof can be employed when implementing the various methods. Certain portions of the methods may be completed by CM utility 222 executing on one or more (virtual) processors (CPU 205A) within CEC 110 (FIG. 1 or 2) or on processing resources of distributed storage repository 150. The executed processes then control specific operations of or on CECs 110, client LPARs 114, VIOSes 112, HMC 229, or distributed storage repository 150. For simplicity in describing the methods, all method processes are described from the perspective of VIOS 112.

In FIG. 7A there is depicted a high-level logical flowchart of an example method of a first VIOS dumping memory contents of a client to distributed data storage responsive to detection of a "spilt-brained" scenario, according to one embodiment. The process begins at block 702. At block 704 the VIOSes in a cluster autonomously/continually monitor keep-alive communications exchanged between VIOSes in the cluster. At block 706 a determination is made whether a first VIOS of the VIOSes in the cluster has lost connectivity with the cluster. When a first VIOS is detected/determined to have lost connectivity with the cluster (or if a connectivity loss is impending), the first VIOS determines a first client that is serviced by the first VIOS from one or more clients serviced by the first VIOS via a table stored within VIOS DB (block 708). The first VIOS then copies/dumps volatile and non-volatile memory utilized by the first client to an allocated storage device within distributed data storage (block 710). At block 712 a determination is made whether the copy/dump has completed. Once the copy/dump has completed, the process terminates at block 720. This process can be concurrently performed for each client on the non-continuing subcluster that has to be migrated until all clients have been migrated.

In FIG. 7B there is depicted a high-level logical flowchart of an example method of a second VIOS migrating memory contents of a client from distributed data storage, according to one embodiment. The process begins at block 732. At block 734 the VIOSes in a cluster autonomously/continually monitor keep-alive communications between VIOSes in a cluster. At block 736 a determination is made by a detecting party whether connectivity has been lost with a first VIOS within the cluster. When lost connectivity with a first VIOS within the cluster is detected or determined, the arbitrator assigns/selects a second VIOS to provide access to memory contents (stored in distributed storage) of a client whose I/O operations were previously serviced by the first VIOS (block 738). The second VIOS then determines the allocated storage device within distributed data storage utilized by the first VIOS during the copy/dump (block 740). At block 742, I/O data and memory stored operations for the client is migrated to the second VIOS and access is provided to the client via the second VIOS to any assigned client LPARs and/or storage devices. At block 744 the I/O operations are activated and/or reconfigured via the second VIOS for the client. The process terminates at block 750.

In FIG. 8 there is depicted a high-level logical flowchart of an exemplary method for restarting memory contents of a logical redundancy unit via a second VIOS in a different CEC, rather than an initially assigned first VIOS, responsive to detection of the first VIOS losing access/connectivity to a distributed storage repository, according to one embodiment. At block 804 the VIOSes in a cluster autonomously/continually monitor keep-alive communications between VIOSes in a cluster. At block 806 a determination is made if a first VIOS has lost access/connectivity to a distributed storage repository. When this scenario has been detected, the detecting party determines a first VIOS on the first CEC that is affected (block 808). The arbitrator then assigns a second VIOS on a second CEC to serve one or more of the clients of the first VIOS (block 810). The second VIOS then determines a storage device within distributed storage repository that is assigned to the first client (block 812). The storage device can be a logical redundancy LU, an AMS partition, or any standard LU previously assigned to the first client. The second VIOS (or the arbitrator) then determines if memory content should be copied by the second VIOS (block 816). When the second VIOS (or the arbitrator) determines that memory content should be copied for access to/by the second VIOS, the memory content is copied (block 818). At block 820 I/O data and operations for the client is migrated to the second VIOS and I/O access is provided to the client LPAR and storage devices via the second VIOS. The process then terminates at block 830.

Generally, with respect to the split-brain response methodology of the described embodiments, a method is provided for responding to a split-brain condition within the VIOS cluster. The method is implemented within a distributed data processing system comprising a virtual input/output server (VIOS) cluster having a shared VIOS database (DB) and a plurality of VIOSes communicatively connected to each other, to the VIOS DB and to a shared storage repository holding one or more client file images. The plurality of VIOSes provides I/O functionality for one or more client logical partitions (LPARs) located on one or more computing electronic complexes (CECs). The method comprises: detecting, at a first VIOS of the plurality of VIOSes, a loss of communication with one or more second VIOSes within the VIOS cluster, wherein the first VIOS maintains communication with other VIOSes to form a first VIOS sub-cluster of the VIOS cluster and the first VIOS sub-cluster maintains communication with the shared VIOS DB and the shared storage repository; assigning the first VIOS sub-cluster as a primary sub-cluster remaining from the VIOS cluster; triggering a migration, from the one or more second VIOSes to the one or more VIOSes within the primary sub-cluster, of one or more clients that were assigned to the one or more second VIOSes prior to the detecting of the loss of communication; and autonomously completing the migration of the one or more clients from the one or more second VIOSes to the one or more VIOSes within the primary sub-cluster.

Additionally, the method comprises updating a resource allocation table of the VIOS DB to reflect the allocation of the one or more clients to the one or more VIOSes within the primary sub-cluster. In one embodiment, the one or more VIOSes within the primary sub-cluster are located on a first set of one or more CECs and the one or more second VIOSes are located on a second set of one or more different CECs. Further, in one embodiment, detecting a loss of communication comprises: exchanging keep-alive information with each other VIOS within the VIOS cluster; autonomously monitoring the keep alive information exchanged between the plurality of VIOSes; detecting from the keep alive information that the one or more second VIOSes from the plurality of VIOSes are no longer in communication with the first VIOS, while the other VIOSes remain in communication with the first VIOS. Also, triggering a migration comprises: in response to detecting that the one or more second VIOSes are no longer in communication with the first VIOS: identifying, from the VIOS DB, the one or more clients that are assigned to the one or more second VIOSes; assigning a replacement VIOS to service the I/O operations of each of the one or more clients in place of the one or more second VIOSes; identifying a storage device within the distributed storage repository that is allocated to a first client; and assigning an adapter pairing of the first client from the one or more second VIOSes to the replacement VIOS to enable the replacement VIOS to access the storage device on behalf of the first client. Additionally, in one or more embodiments, the storage device is one of a logical unit (LU) and a redundancy logical unit (rLU), wherein the redundancy LU is an up-to-date copy of the data stored within the LU.

In one embodiment, autonomously completing the migration comprises: assigning to the first client a second client logical partition (LPAR) located on a CEC from among a first set of one or more CECs associated with the primary VIOS sub-cluster; migrating a plurality of I/O configuration data and one or more operations of the first client to the replacement VIOS; activating the plurality of I/O configuration data and the one more operations for the first client at the replacement VIOS; autonomously copying a memory of the first client from the storage device; in response to determining that the copying of the memory has completed, autonomously restoring the memory to the second client LPAR.

In another embodiment, the method of autonomously completing the migration further comprises: triggering, on detection of the loss of communication or during establishment of the primary VIOS sub-cluster, an autonomous dumping by a client partition of all memory of the first client to an active memory sharing (AMS) paging device, wherein the AMS paging device is a logical unit carved from the distributed storage repository; in response to determining that the dumping of the memory of the first client has completed, assigning a second client LPAR to the first client on a CEC within the first set of one or more CECs associated with the primary VIOS sub-cluster; and autonomously restoring the memory of the first client to the second client LPAR.

In another embodiment the above method processes are implemented as processing logic within a computing electronic complex (CEC) that comprises: a processor; an input/output (I/O) interface coupled to an external network; and a memory coupled to said processor, wherein said memory includes: a virtualization management component; a plurality of operating system (OS) partitions including at least a first virtual input/output (I/O) server (VIOS) and one or more client logical partitions (LPARs); and a split-brain response utility executing on a processing resource allocated to the first VIOS that causes the first VIOS to perform the above functions when executing with a VIOS cluster having a shared VIOS database (DB) and a plurality of other cluster-aware VIOSes in communication with each other and connected to a shared storage repository.

The flowcharts and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a distributed data processing system (DPS) comprising a virtual input/output server (VIOS) cluster having a shared VIOS database (DB) and a plurality of VIOSes that provide I/O functionality for one or more client logical partitions (LPARs) located on one or more computing electronic complexes (CECs), a method for responding to a split-brain condition within the VIOS cluster, the method comprising:
   detecting, at a first VIOS of the plurality of VIOSes, a loss of communication with one or more second VIOSes within the VIOS cluster, wherein each of the plurality of VIOSes is communicatively connected to the other VIOSes, to the VIOS DB and to a shared storage repository of the distributed DPS holding one or more client file images, and wherein the first VIOS maintains communication with other first VIOSes to form a first VIOS sub-cluster of the VIOS cluster and the first VIOS sub-cluster includes only VIOSes that maintain communication with the other first VIOSes, the shared VIOS DB, and the shared storage repository when the loss of communication with the one or more second VIOSes is detected;
   assigning the first VIOS sub-cluster as a primary sub-cluster remaining from the VIOS cluster; and
   in response to the detected loss of communication while the first VIOS sub-cluster remains communicatively connected to the VIOS DB and to the shared storage repository:
      autonomously triggering a migration, from the one or more second VIOSes to the one or more first VIOSes within the primary sub-cluster, of one or more clients that were assigned to the one or more second VIOSes prior to detecting the loss of communication; and
      autonomously completing the migration of the one or more clients from the one or more second VIOSes to the one or more first VIOSes within the primary sub-cluster.

2. The method of claim 1, wherein the one or more first VIOSes within the primary sub-cluster are located on a first set of one or more CECs and the one or more second VIOSes are located on a second set of one or more different CECs.

3. The method of claim 1, further comprising:
   maintaining a resource allocation table at the VIOS DB which maps which clients are assigned to which VIOS within the VIOS cluster; and
   dynamically updating the resource allocation table of the VIOS DB to reflect a new allocation of the one or more clients to the one or more VIOSes within the primary sub-cluster.

4. The method of claim 1, wherein said detecting a loss of communication comprises:
   each VIOS within the VIOS cluster exchanging keep-alive information with each other VIOS within the VIOS cluster;
   the first VIOS autonomously monitoring the keep alive information exchanged between the plurality of VIOSes; and
   detecting from the keep alive information that the one or more second VIOSes from the plurality of VIOSes are no longer in communication with the first VIOS, while the other first VIOSes remain in communication with the first VIOS.

5. The method of claim 4, wherein triggering a migration comprises:
   in response to detecting that the one or more second VIOSes are no longer in communication with the first VIOS:
      identifying, from the VIOS DB, the one or more clients that are assigned to the one or more second VIOSes;
      assigning a replacement VIOS from among the primary sub-cluster to service the I/O operations of each client of the one or more clients in place of the one or more second VIOSes;
      identifying a storage device within the shared storage repository that is allocated to a first client; and
      assigning an adapter pairing of the first client from a previously assigned second VIOS of the one or more second VIOSes to the replacement VIOS to enable the replacement VIOS to access the storage device on behalf of the first client.

6. The method of claim 5, wherein autonomously completing the migration comprises:
   assigning to the first client a second client logical partition (LPAR) located on a CEC from among one or more CECs associated with the primary sub-cluster;
   migrating a plurality of I/O configuration data and one or more operations of the first client to the replacement VIOS;
   activating the plurality of I/O configuration data and the one more operations for the first client at the replacement VIOS;
   autonomously copying a memory of the first client from the storage device; and
   in response to determining that the copying of the memory has completed, autonomously restoring the memory to the second client LPAR.

7. The method of claim 5, wherein the storage device is one of a logical unit (LU) and a redundancy logical unit (rLU), wherein the redundancy LU is an up-to-date copy of the data stored within the LU.

8. The method of claim 5, wherein the autonomously completing the migration comprises:
   triggering, in response to detection of the loss of communication, an autonomous dumping by a client partition of all memory of the first client to an active memory sharing (AMS) paging device, wherein the AMS paging device is a logical unit carved from the shared storage repository;

in response to determining that the dumping of the memory of the first client has completed, assigning a second client LPAR to the first client on a CEC within the one or more CECs associated with the primary sub-cluster; and autonomously restoring the memory of the first client to the second client LPAR.

9. A computing electronic complex (CEC) comprising:

a processor;

an input/output (I/O) interface coupled to an external network; and a memory coupled to said processor, wherein said memory includes: a virtualization management component; a plurality of operating system (OS) partitions including at least a first virtual input/output (I/O) server (VIOS) and one or more client logical partitions (LPARs); and a split-brain response utility executing on a processing resource allocated to the first VIOS that causes the first VIOS to perform the following functions when executing with a VIOS cluster having a shared VIOS database (DB) and a plurality of other cluster-aware VIOSes in communication with each other and connected to a shared storage repository:

detect, at the first VIOS of the plurality of VIOSes, a loss of communication with one or more second VIOSes within the VIOS cluster, wherein the first VIOS maintains communication with other VIOSes to form a first VIOS sub-cluster of the VIOS cluster and the first VIOS sub-cluster includes only VIOSes that maintain communication with the other VIOSes, the shared VIOS DB, and the shared storage repository when the loss of communication with the one or more second VIOSes is detected;

assign the first VIOS sub-cluster as a primary sub-cluster remaining from the VIOS cluster; and in response to the detected loss of communication while the first VIOS sub-cluster remains communicatively connected to the VIOS DB and to the shared storage repository:

trigger a migration, from the one or more second VIOSes to the one or more VIOSes within the primary sub-cluster, of one or more clients that were assigned to the one or more second VIOSes prior to detecting the loss of communication;

autonomously complete the migration of the one or more clients from the one or more second VIOSes to the one or more VIOSes within the primary sub-cluster; and dynamically update a resource allocation table of the VIOS DB to reflect a new allocation of the one or more clients to the one or more VIOSes within the primary sub-cluster.

10. The computing electronic complex of claim 9, wherein the one or more VIOSes within the primary sub-cluster are located on a first set of one or more CECs and the one or more second VIOSes are located on a second set of one or more different CECs.

11. The computing electronic complex of claim 9, wherein said first VIOS detecting a loss of communication comprises:

each VIOS exchanging keep-alive information with each other VIOS within the VIOS cluster;

the first VIOS autonomously monitoring the keep alive information exchanged between the plurality of VIOSes; and the first VIOS detecting from the keep alive information that the one or more second VIOSes from the plurality of VIOSes are no longer in communication with the first VIOS, while the other VIOSes remain in communication with the first VIOS.

12. The computing electronic complex of claim 11, wherein the triggering a migration comprises:

in response to detecting that the one or more second VIOSes are no longer in communication with the first VIOS, the first VIOS:

identifies, from the VIOS DB, the one or more clients that are assigned to the one or more second VIOSes;

assigns a replacement VIOS from among the primary sub-cluster to service the I/O operations of each client of the one or more clients in place of the one or more second VIOSes;

identifies a storage device within the shared storage repository that is allocated to a first client, wherein the storage device is one of a logical unit (LU) and a redundancy logical unit (rLU), wherein the redundancy LU is an up-to-date copy of the data stored within the LU; and assigns an adapter pairing of the first client from a previously assigned second VIOS of the one or more second VIOSes to the replacement VIOS to enable the replacement VIOS to access the storage device on behalf of the first client.

13. The computing electronic complex of claim 12, wherein autonomously completing the migration comprises:

assigning to the first client a second client logical partition (LPAR) located on a CEC from among one or more CECs associated with the primary sub-cluster;

migrating a plurality of I/O configuration data and one or more operations of the first client to the replacement VIOS;

activating the plurality of I/O configuration data and the one more operations for the first client at the replacement VIOS;

autonomously copying a memory of the first client from the storage device; and in response to determining that the copying of the memory has completed, autonomously restoring the memory to the second client LPAR.

14. The computing electronic complex of claim 9, wherein the split-brain response utility further provides the functions of:

triggering, in response to detection of the loss of communication, an autonomous dumping by a client partition of all memory of the first client to an active memory sharing (AMS) paging device, wherein the AMS paging device is a logical unit carved from the shared storage repository;

in response to determining that the dumping of the memory of the first client has completed, assigning a second client LPAR to the first client on a CEC within the one or more CECs associated with the primary sub-cluster; and autonomously restoring the memory of the first client to the second client LPAR.

15. A computer program product comprising:

a computer readable storage device; and program code on the computer readable storage device that, when executed by a processor of a first virtual input/output server (VIOS) within a VIOS cluster having a shared VIOS database (DB) and a plurality of other cluster-aware VIOSes in communication with each other and the first VIOS and connected to a shared storage repository, causes the first VIOS to perform the functions of:

detecting, at the first VIOS of the plurality of VIOSes, a loss of communication with one or more second VIOSes within the VIOS cluster, wherein the first VIOS maintains communication with other VIOSes to form a first VIOS sub-cluster of the VIOS cluster and the first VIOS sub-cluster includes only VIOS that maintains communication with the other VIOSes, the shared VIOS DB, and the shared storage repository when the loss of communication with the one or more second VIOSes is detected;

assigning the first VIOS sub-cluster as a primary sub-cluster remaining from the VIOS cluster; and in response to the detected loss of communication while the first VIOS sub-cluster remains communicatively connected to the VIOS DB and to the shared storage repository:

autonomously triggering a migration, from the one or more second VIOSes to the one or more VIOSes within the primary sub-cluster, of one or more clients that were assigned to the one or more second VIOSes prior to the detecting of the loss of communication;

autonomously completing the migration of the one or more clients from the one or more second VIOSes to the one or more VIOSes within the primary sub-cluster; and dynamically updating a resource allocation table of the VIOS DB to reflect a new allocation of the one or more clients to the one or more VIOSes within the primary sub-cluster.

16. The computer program product of claim 15, wherein the one or more VIOSes within the primary sub-cluster are located on a first set of one or more CECs and the one or more second VIOSes are located on a second set of one or more different CECs.

17. The computer program product of claim 15, wherein the program code for detecting a loss of communication comprises code for:

exchanging keep-alive information with each other VIOS within the VIOS cluster;

autonomously monitoring the keep alive information exchanged between the plurality of VIOSes; and detecting from the keep alive information that the one or more second VIOSes from the plurality of VIOSes are no longer in communication with the first VIOS, while the other VIOSes remain in communication with the first VIOS.

18. The computer program product of claim 15, wherein the program code for triggering a migration comprises code for:

in response to detecting that the one or more second VIOSes are no longer in communication with the first VIOS:

identifying, from the VIOS DB, the one or more clients that are assigned to the one or more second VIOSes;

assigning a replacement VIOS from among the primary sub-cluster to service the I/O operations of each client of the one or more clients in place of the one or more second VIOSes;

identifying a storage device within the shared storage repository that is allocated to a first client, wherein the storage device is one of a logical unit (LU) and a redundancy logical unit (rLU), wherein the redundancy LU is an up-to-date copy of the data stored within the LU; and assigning an adapter pairing of the first client from a previously assigned second VIOS of the one or more second VIOSes to the replacement VIOS to enable the replacement VIOS to access the storage device on behalf of the first client.

19. The computer program product of claim 16, wherein the program code for autonomously completing the migration further comprising code for:

assigning to the first client a second client logical partition (LPAR) located on a CEC from among one or more CECs associated with the primary sub-cluster;

migrating a plurality of I/O configuration data and one or more operations of the first client to the replacement VIOS;

activating the plurality of I/O configuration data and the one more operations for the first client at the replacement VIOS;

autonomously copying a memory of the first client from the storage device; and in response to determining that the copying of the memory has completed, autonomously restoring the memory to the second client LPAR.

20. The computer program product of claim 17, the program code for autonomously completing the migration further comprising code for:

in response to detecting the loss of communication, triggering an autonomous dumping by a client partition of all memory of the first client to an active memory sharing (AMS) paging device, wherein the AMS paging device is a logical unit carved from the shared storage repository;

in response to determining that the dumping of the memory of the first client has completed, assigning a second client LPAR to the first client on a CEC within the one or more CECs associated with the primary sub-cluster; and autonomously restoring the memory of the first client to the second client LPAR.

* * * * *